United States Patent
Olsson et al.

(10) Patent No.: US 11,877,909 B2
(45) Date of Patent: Jan. 23, 2024

(54) DENTAL IMPLANT SET

(71) Applicant: DENTSPLY SIRONA Inc., York, PA (US)

(72) Inventors: Brita Olsson, Gothenburg (SE); Daniel Magnusson, Hönö (SE)

(73) Assignee: DENTSPLY SIRONA INC, York, PA (US)

( * ) Notice: Subject to any disclaimer, the term of this patent is extended or adjusted under 35 U.S.C. 154(b) by 431 days.

(21) Appl. No.: 17/106,382

(22) Filed: Nov. 30, 2020

(65) Prior Publication Data

US 2021/0077229 A1   Mar. 18, 2021

Related U.S. Application Data

(63) Continuation of application No. 16/214,518, filed on Dec. 10, 2018, now abandoned, which is a (Continued)

(30) Foreign Application Priority Data

Apr. 19, 2012   (EP) ..................................... 12164822

(51) Int. Cl.
*A61C 8/00* (2006.01)

(52) U.S. Cl.
CPC ............ *A61C 8/0074* (2013.01); *A61C 8/008* (2013.01); *A61C 8/0013* (2013.01); (Continued)

(58) Field of Classification Search
CPC ... A61C 8/0074; A61C 8/0013; A61C 8/0066; A61C 8/0068; A61C 8/0069; (Continued)

(56) References Cited

U.S. PATENT DOCUMENTS

| | | | | |
|---|---|---|---|---|
| 6,227,859 | B1 * | 5/2001 | Sutter ................... | A61C 8/0066 433/173 |
| 2008/0299516 | A1 * | 12/2008 | Aldecoa ............... | A61C 8/0066 433/174 |
| 2009/0239196 | A1 * | 9/2009 | Lerner ................. | A61C 8/0069 433/174 |

FOREIGN PATENT DOCUMENTS

DE   102010019582 A1 * 11/2011 ........... A61C 8/0013

OTHER PUBLICATIONS

Holger Zipprich, Dental implant for implanting into jaw bone of patient, has body part including contact pin introduced into recess of post part, where connection bolt attaches body part with post part. Machine translation (Year: 2011).*

(Continued)

*Primary Examiner* — Ralph A Lewis
*Assistant Examiner* — Mirayda A Aponte
(74) *Attorney, Agent, or Firm* — DENTSPLY SIRONA INC.

(57) ABSTRACT

The present invention relates to a dental implant set having a fixture for insertion into a bore hole arranged in bone tissue having first indexing means, a dental component having second indexing means and being adaptable to the fixture in an engaged position where the first and second indexing means mate and in an intermediate position where the dental component and the fixture are in contact with each other but the first and the second indexing means do not mate, and a fixation screw being adapted for fixating the dental component to the fixture. The present invention also relates to a method for attaching a dental component to a dental fixture.

12 Claims, 7 Drawing Sheets

Related U.S. Application Data continuation of application No. 13/862,608, filed on Apr. 15, 2013, now abandoned.

(60) Provisional application No. 61/635,345, filed on Apr. 19, 2012.

(52) U.S. Cl.
CPC .......... *A61C 8/0066* (2013.01); *A61C 8/0068* (2013.01); *A61C 8/0069* (2013.01); *A61C 8/0089* (2013.01)

(58) Field of Classification Search
CPC ....... A61C 8/008; A61C 8/0089; A61C 8/005; A61C 8/0048; A61C 8/0012
USPC ...................................... 433/173–176, 201.1
See application file for complete search history.

(56) References Cited

OTHER PUBLICATIONS

Holger Zipprich, Dental implant for implanting into jaw bone of patient, has body part including contact pin introduced into recess of post part, where connection bolt attaches body part with post part, Machine translation, DE 102010019582 A1 (Year: 2011).*

* cited by examiner

DENTAL IMPLANT SET

CROSS-REFERENCE TO RELATED APPLICATIONS

This patent application is a continuation of U.S. patent application Ser. No. 16/214,518 filed on Dec. 10, 2018, which is a continuation of U.S. patent application Ser. No. 13/862,608 filed on Apr. 15, 2013 which claims the benefit of and priority to EP Application Ser No. 12164822.4, filed on Apr. 19, 2012 and U.S. Provisional Patent Application Ser. No. 61/635,345, filed on Apr. 19, 2012, which are herein incorporated by reference for all purposes.

TECHNICAL FIELD OF THE INVENTION

The present invention relates to a dental implant set comprising a fixture, a dental component and a fixation screw. The invention also relates to a method for the connection of a dental component to a fixture by the means of a fixation screw.

BACKGROUND OF THE INVENTION

A frequent way today to restore a damaged or lost tooth is to install a dental implant comprising a fixture in the adjacent jawbone tissue (maxilla or mandible) and replace the damaged or lost tooth with a dental prosthesis. A superstructure, such as an abutment, may be used as a connection between the dental prosthesis and the installed fixture.

A common technique to fasten the abutment to the fixture is by using an abutment screw. Usually the abutment screw has an externally threaded portion and a screw head and may thereby be screwed into the fixture which has an internal bore with a corresponding threaded portion. When fastening the abutment to the fixture, the abutment is first mated to the fixture and then the abutment screw is inserted into a through-hole of the abutment so that the threaded portion of the abutment screw engages the internal threading of the fixture and the screw head is seated on a seat in the through-hole of the abutment.

Other dental components may also need to be attached to the fixture during the process of preparing and installing a dental prosthesis. Such dental components may e.g. be healing caps and impression elements. Together with the fixture, the different components may be referred to as a dental implant set.

Furthermore, there are various fixture configurations. For instance, a fixture may have a flat topped coronal head portion, which may be installed in any rotational position relative the jaw bone. Another type of fixture configuration is a fixture having a sloped coronal end portion in which the length of the fixture is greater on the lingual side than the buccal side in order to match the contour of the jawbone. Similarly, to the above described fixture/jawbone-interface, for a superstructure, such as an abutment, there may be an abutment/fixture-interface in which the abutment should only be positioned in one way relative to the fixture, e.g. an abutment having a sloped portion matching the sloped head portion of a fixture. This is one type of asymmetrical superstructure, in which the asymmetrical feature should be positioned in a desired rotational relationship to either or both of the fixture and the jawbone with surrounding teeth. Thus, with regard to these interfaces, it would be desirable to ensure that the dentist connects the superstructure with a correct rotational orientation relative to certain fixtures or jawbone features. Also for patient-specific or customized superstructures, such as a customized abutment, such superstructure may often be made with a certain intended rotational orientation relative to the fixture and surrounding contours. Thus, also in these cases it would be desirable to ensure that the dentist connects the superstructure with a correct rotational orientation relative to the fixture and other features in the oral cavity.

In order to be able to correctly position and/or hold a dental component in a fixed rotational position indexing means are generally used. However, positioning of small components in correct rotational position to the dental implants is difficult, especially in narrow and challenging situations with limited space, such as a patient's mouth. The user may for example experience difficulties to see which the correct orientation is and he/she may also have to rotate the abutment for a while before the correct rotational position is located. Furthermore, there may be long-term consequences for the patient if the dental component is either oriented rotationally incorrect, or if the indexing means of the dental component and the fixture are not engaged with each other. In the latter situation, the dental component may be positioned axially incorrect. Owing to the conditions occurring during the installation of a dental implant set, i.e. a very limited space and limited visibility, the industry is in need of improvements entailing a simpler connection of a dental component to a fixture.

SUMMARY OF THE INVENTION

An object of the invention is to overcome the above problems, and to provide a dental implant set which facilitates the connection procedure of a dental component to a fixture. This and other objects, which will become apparent in the following, are accomplished by means of a dental implant set and a method defined in the accompanying claims.

According to at least a first aspect of the present invention, a dental implant set is provided. The dental implant set comprises: a fixture for insertion into a bore hole arranged in bone tissue having first indexing means, a dental component having second indexing means and being adaptable to the fixture in an engaged position where the first and second indexing means mate and in an intermediate position where the dental component and the fixture are in contact with each other but the first and the second indexing means do not mate, and a fixation screw being adapted for fixating the dental component to the fixture, wherein in the intermediate position: a first contacting surface of the fixation screw is arranged to abut a second contacting surface of the dental component and a third contacting surface of the dental component is arranged to abut a fourth contacting surface of the fixture, and wherein the dental implant set is arranged such that the maximum capacity to transmit torque is greater between the first and second contacting surfaces than between the third and fourth contacting surfaces, so that when the fixation screw is subject to a torque and an axial force applied by a user, the dental component will rotate with the fixation screw.

If the maximum capacity of transferring torque at the contacting surfaces of two bodies is higher than an applied torque, the applied torque will be transferred from one body to the other, and the two bodies will rotate together. Conversely, if the maximum capacity of transferring torque at the contacting surfaces of two bodies is lower than an applied torque, the two bodies will rotate in relation to each other.

Owing to this, the first aspect of the invention is based on the insight that the contacting surfaces between the different components can be arranged such that when the dental component and the fixture are in the intermediate position, in which position the first and second contacting surfaces are in contact with each other and the third and fourth contacting surfaces are in contact with each other, applying a torque and an axial force directed in the apical direction of the dental implant set to the fixation screw by means of e.g. a driver operated by a user, will result in that the dental component is rotated along with the fixation screw, when the applied torque reaches the maximum capacity of torque transfer between the third and fourth contacting surfaces and is lower than the maximum capacity of torque transfer between the first and second contacting surfaces. The dental component is rotated with the fixation screw until it reaches the engaged position in which the first and second indexing means mate. Thus, the user, e.g. a dentist, can during the installation of the dental component to the fixture reposition the dental component from the intermediate position to the engaged position simply by applying a torque and an axial force directed in the apical direction of the dental implant set to the fixation screw. Hereby, the user does not need one hand to hold and position the dental component and another hand to tighten the screw. The dental component may for example be held in position by applying an axial force directed in the apical direction of the fixation screw to the fixation screw by means of the driver and subsequently, the user may locate the correct rotational position between the dental component and the fixture by rotating the fixation screw together with the dental component. Thus, the dental component will rotate relative to the fixture and together with the fixation screw until the first and the second indexing means mate. Hereby, the user can fixate the dental component to the fixture by means of the fixation screw using one hand only.

It should be noted that the expression that the dental component rotates with the fixation screw does not mean that the dental component must rotate along with the fixation screw in every rotation but may sometime slip or have a different angular velocity.

It should be noted that the dental implant set may comprise additional components. The additional components may be arranged to rotate with the fixation screw or not, as long as the dental component rotates along with the fixation screw. Thus, according to some example embodiments, the fixation screw is an abutment screw. According to other example embodiments, the dental component is a healing cap, an abutment, an abutment replica or an impression element such as a pickup or transfer coping, respectively. The dental component may be a one piece component, but it may also be constituted of two or more parts that together form a dental component.

During the installation of the dental component to the fixture, the fixation screw is in contact with the dental component via the first and second contacting surfaces. Hereby, at least a part of the fixation screw may abut at least a part of the dental component allowing torque to be transferred from the fixation screw to the dental component. Similarly, the dental component is in contact with the fixture via the third and fourth contacting surfaces. Hereby, at least a part of the dental component may abut at least a part of the fixture allowing torque to be transferred from the dental component to the fixture.

According to one exemplary embodiment, the dental component is moved in the apical direction of the fixture when moving from the intermediate position to the engaged position. Hence, the user may need to apply the axial force in the apical direction of the dental implant set as well as said torque to said dental component in order to rotate and move the dental component in the apical direction of the fixture once the correct rotational position between the dental component and the fixture is achieved.

According to at least one example embodiment, the dental component and the fixation screw is pre-connected to each other. Hereby, the positioning of the dental component to the fixture is especially facilitated since the user does not need one hand to hold the dental component and another hand to place the fixation screw in position. According to at least one example embodiment, the dental component and the fixation screw are held together by means of a threaded engagement. According to at least yet another example embodiment, the dental component and the fixation screw is pre-connected by means of adhesive.

According to at least one example embodiment, in the engaged position, the dental component is arranged such that the fixation screw may rotate relative the dental component. That is, in the engaged position, the dental component is rotationally locked relative to the fixture while the fixation screw is allowed to freely rotate. Consequently, tightening of the fixation screw is possible and thereby, the fixation of the dental component to the fixture.

According to at least one example embodiment, the fixation screw comprises a non-threaded first contacting surface located coronally of a threaded portion of the fixation screw, wherein the first contacting surface forms a first non-zero angle in relation to an axis of the fixture during and after installation of the dental component to the fixture. The first contacting surface of the fixation screw is configured and dimensioned to provide a first friction against the second contacting surface of the dental component. Similarly, according to at least one example embodiment, the dental component comprises a non-threaded third contacting surface, wherein said third contacting surface forms a second non-zero angle in relation to the axis of the fixture during and after installation of the dental component to the fixture. The third contacting surface of the dental component is configured and dimensioned to provide a second friction, against the fourth contacting surface of the fixture.

According to at least one example embodiment, the fixture further comprises an axis, and at least one of the first and second contacting surfaces forms a smaller angle to the axis than at least one of the third and fourth contacting surfaces. Consequently, different frictions based on different inclinations may be provided between the first and second contacting surfaces and the third and fourth contacting surfaces. By providing a smaller angle between at least one of the first and second contacting surfaces and the axis compared to an angle between at least one of the third and fourth contacting surfaces and the axis, the maximum capacity of torque transfer via the first and second surfaces may, everything else being equal, be larger compared to the maximum capacity of torque transfer via the third and fourth surfaces, due to different friction.

According to at least one example embodiment the first and second contacting surfaces forms an essentially equal first angle to the axis, and the third and fourth contacting surfaces forms an essentially equal second angle to the axis. This means that the contact between the first and the second contacting surfaces and the contact between the third and fourth contacting surfaces may be provided along an extension of the surfaces, and not only in a single point. This has the implication that the torque may be transferred by a larger area.

According to at least one example embodiment, the dental component further comprises an axis coinciding with the axis of the fixture during and after installation of the dental component to the fixture. According to at least one example embodiment, the fixation screw further comprises an axis coinciding with the axis of the fixture during and after installation of the dental component to the fixture. According to at least one example embodiment, the axis of the fixture, the dental component and the fixation screw coincides during and after installation of the dental component to the fixture.

According to at least one example embodiment, at least one of the first and second contacting surfaces tapers in the apical direction. According to at least one example embodiment, at least one of the third and fourth contacting surfaces tapers in the apical direction.

According to at least one example embodiment, at least one of the first and second contacting surfaces forms a first angle of 5°-30° relative to the axis of the fixture, and at least one of the third and fourth contacting surfaces forms a second angle of 50°-70° relative to the axis of the fixture. By providing the first angle steeper than the second angle, the maximum capacity of torque transfer between the first and second contacting surfaces is larger than the maximum capacity of torque transfer between the third and fourth contacting surfaces, provided that other features of the surfaces are the same. According to at least one example embodiment, the first angle is about 5-11° and the second angle is about 60°, respectively.

According to at least one example embodiment, a dental implant set is provided in which mating portions of the first and second contacting surfaces form a first contacting area and mating portions of the third and fourth contacting surfaces form a second contacting area, and wherein the first contacting area is larger than the second contacting area.

In other words, according to at least one example embodiment, the first contacting surface of the fixation screw has a larger area which is intended for contact with the second contacting surface of the dental component than the area of the third contacting surface of the dental component intended for contact with the fourth contacting surface of the fixture.

According to at least one example embodiment at least one of the contacting surfaces has different surface characteristics than the others in order to modify the coefficient of friction between the first and second contacting surfaces or between the third and fourth contacting surfaces. Hereby, an alternative way to provide for a different maximum capacity to transfer torque between the contacting surfaces is provided. Thus, the maximum capacity to transfer torque between the different components via the contacting surfaces may be altered by means of different surface characteristics.

According to at least one example embodiment at least one of the contacting surfaces is coated with a material in order to modify the coefficient of friction between the first and second contacting surfaces or between the third and fourth contacting surfaces. Hereby, yet an alternative way to provide for a different friction and thereby different level of maximum capacity of torque transfer between the contacting surfaces is provided. The coating may e.g. be TiN (titanium nitride) or AlTiN (aluminium titanium nitride) which both increase the friction. The coating may e.g. also be a-C:H (amorphous hydrogenated carbon) which reduces the friction.

According to at least one example embodiment, at least one of the contacting surfaces is surface treated in order to modify the coefficient of friction between the first and second contacting surfaces or between the third and fourth contacting surfaces. Hereby, yet another alternative manner to provide for a different coefficient of friction and thereby different level of maximum capacity of torque transfer between the contacting surfaces is provided.

According to one exemplary embodiment, the material of at least one of the first, second, third or fourth contacting surfaces is chosen such that it has different frictional characteristics than at least one of the other surfaces. It is for example conceivable that one of the components of the dental implant set is made of titanium, while another component is made of a ceramic material such as zirconia, and the third component may be made of e.g. gold. It is in this embodiment not necessary that an entire component is made of the same material, it is for example conceivable with a dental component such as an abutment that is made of zirconia and titanium. In that case, the second contacting surface may be made of zirconia while the third contacting surface may be made of titanium.

By providing contacting surfaces which are surface treated and/or coated with a material, made of different materials and/or by any other means differed, the coefficient of friction may be provided such that it differs between the different contacting surfaces. Thus according to at least one example embodiment at least one of the contacting surfaces has a different coefficient of friction compared to the other contacting surfaces. The difference in coefficient of friction may, for instance, be achieved by surface modification, surface roughening by etching or blasting, anodization or surface coating.

According to at least one example embodiment, the contacting surfaces are provided such that a first frictional force between the first and second contacting surfaces is larger for a given applied axial force directed in the apical direction of the dental implant set than a second frictional force between the third and fourth contacting surfaces for the same applied axial force.

Thus, if the surfaces in contact between the different components are either modified, differed or arranged such that the frictional force between the fixation screw and the dental component is larger than the frictional force between the dental component and the fixture, the maximum capacity to transfer torque from the fixation screw to the dental component may, everything else being equal, be larger compared to the maximum capacity to transfer torque from the dental component to the fixture. Hereby, the dental component will be able to rotate along with the fixation screw in the intermediate position.

Furthermore, according to at least one example embodiment, the first contacting surface of the fixation screw is surface modified in one way, while the second contacting surface of the dental component is not modified at all or modified in another way. According to at least yet another example embodiment the first contacting surface of the fixation screw is not modified at all, while the second contacting surface of the dental component is surface modified. According to at least one example embodiment the third contacting surface of the dental component is surface modified in one way, while the fourth contacting surface of the fixture is not modified at all or modified in another way. According to at least yet another example embodiment the third contacting surface of the dental component is not modified at all, while the fourth contacting surface of the fixture is surfaced modified.

According to at least one example embodiment, the coefficient of friction between the first and second contacting surfaces (i.e. between the fixation screw and the dental component) is larger than the coefficient of friction between the third and fourth contacting surfaces (i.e. between the dental component and the fixture).

If the difference in coefficient of friction is provided by different surface roughness, this may be accomplished by means of e.g. blasting, etching or any other suitable process known in the art. The surface roughness of at least one of the contacting surfaces may be greater than the others.

It is also conceivable to further differentiate the friction provided by the first, second, third and fourth contacting surfaces by combining various friction increasing and/or friction reducing measures. Thus, according to at least one example embodiment, at least one of the contacting surfaces is provided with friction increasing measures. According to at least yet another example embodiment, at least one of the contacting surfaces is provided with friction reducing measures. According to at least one example embodiment, at least one of the contacting surfaces is provided with friction increasing measures while at least one of the other contacting surfaces is provided with friction reducing measures. Thus, the first or second contacting surface may be provided with friction increasing measures while the third or fourth contacting surface may be provided with friction reducing measures in order to allow the dental component to rotate with the fixation screw in the intermediate position.

It is also conceivable that the fixation screw is provided with friction reducing measures in order for the threaded portion of the fixation screw to more easily mate with a threaded bore of the fixture. Hereby, other means to increase the maximum capacity of torque transfer between the first and second contacting surface are needed (e.g. a steep inclination of the first and second contacting surfaces as seen in relation to the axis of the fixture) in order to provide for a higher maximum capacity of torque transfer between the first and second contacting surfaces compared to the maximum capacity of torque transfer between the third and the fourth contacting surfaces.

It should be noted that any type of combinations regarding surface angle relative the axis and surface modifications between the contacting surfaces are conceivable in order to enable the dental component to rotate together with the fixation screw in the intermediate position. For instance, the first or second contacting surface may provide for a high degree of maximum capacity of torque transfer by providing a steep inclination while the third and fourth contacting surfaces may provide for a low degree of maximum capacity of torque transfer by being provided with friction reducing measures.

However, in order for the dental component to rotate along with the fixation screw in the intermediate position, other connection means between the different components are conceivable. Thus, according to at least one example embodiment, at least one of the contacting surfaces is provided with projections or ribs. According to at least one example embodiment, the contacting surfaces are provided with threads. According to at least one example embodiment, at least one of the contacting surfaces is provided with grooves. Thus, the projections e.g. formed as ribs, on one of the contacting surfaces may connect with another contacting surface possibly provided with grooves which may interconnect with said projections. Consequently, if the first contacting surface of the fixation screw is provided with ribs and the second contacting surface of the dental component is provided with corresponding grooves, the interconnecting ribs/grooves may allow the dental component to rotate along with the fixation screw until the dental component falls into the engaged position with the fixture. The threads may also provide for the dental component to rotate along with the fixation screw until the dental component falls into the engaged position with the fixture. In the engaged position, the interconnection force between the contacting surfaces by the ribs/grooves or threads is overcome and the fixation screw is able to rotate in relation to the dental component.

According to at least one other example embodiment, at least one of the contacting surfaces is provided with an adhesive. Hereby, the fixation screw, the dental component and/or the fixture may be interconnected in a similar manner as by the ribs and grooves described above. Consequently, if the first contacting surface of the fixation screw is provided with an adhesive, the dental component may rotate along with the fixation screw until the dental component falls into the engaged position with the fixture. In the engaged position, the interconnection force between the contacting surfaces by the adhesive is overcome. Of course, other alternatives providing interconnection between the different components are conceivable, such as magnetic forces. Thus, according to at least yet another embodiment, at least one of the contacting surfaces is magnetic.

According to yet another further embodiment, the third and/or fourth contacting surfaces slopes downward in the direction of rotation. By this arrangement, the reaction force from the contact between the third and fourth contacting surfaces will have a component in the direction of rotation. Thereby, the maximum capacity of torque transfer is reduced. Hence, less torque will be required to move the third and fourth contacting surfaces in relation to each other and the dental component will thereby easier rotate in relation to the dental fixture until it reaches the engaged position.

In the exemplary embodiments described above, several different alternative manners for affecting the maximum capacity of torque transfer to the dental component via the first and second contacting surfaces and the maximum capacity of torque transfer to the fixture via the third and fourth contacting surfaces have been described. However, in general terms the maximum capacity of torque transfer between the first and second contacting surfaces should be greater than the maximum capacity of torque transfer between the third and fourth contacting surfaces in the intermediate position, as is explained in conjunction with the first aspect of the present invention. The capacity to transfer torque is a function of the force applied and the length of the lever arm. In the present case, the potential peripherally directed force which can be applied to each one of the contacting surfaces is the normal force exerted on the respective surface by the force being applied by the user multiplied with the coefficient of friction between the surfaces. As the normal force is perpendicular to the surface, the normal force for each one of the surfaces is the force being applied by the user divided with sine for the angle between the respective surface and the axis of the fixture. The length of the respective lever is the distance from the axis of the dental implant set or fixture and the respective contact surface. Hence, in order for the maximum capacity of torque transfer between the first and second contacting surfaces to be larger than the maximum capacity of torque transfer between the third and fourth contacting surfaces, the integral of the function: normal force times coefficient of friction times lever integrated over the contact surface, should be larger at the first and second contacting surfaces than at the third and fourth contacting surfaces. Mathematically, this could be expressed as:

$$\int F_{N1}\mu_1 r_1 dA_1 > \int F_{N2}\mu_2 r_2 dA_2$$

wherein, $F_{N1}$ is the normal force acting at the first and second contact surfaces of the dental component;

$\mu_1$ is the coefficient of friction between the first and second contact surfaces;

$r_1$ is the distance from the first and second contact surfaces to the axis of the implant set or the fixture;

$A_1$ is the contact area of the first and second contacting surfaces;

$F_{N2}$ is the normal force acting at the third and fourth contact surfaces of the fixture;

$\mu_2$ is the coefficient of friction between the third and fourth contact surfaces;

$r_2$ is the distance from the third and fourth contact surfaces to the axis of the implant set or the fixture;

$A_2$ is the contact area of the third and fourth contacting surfaces.

Hence, the above-described exemplary embodiments describe different measures for affecting either the normal force being exerted on the respective contacting surfaces or the coefficient of friction of the respective contacting surfaces. According to at least one example embodiment, a dental implant set is provided wherein the fixture further comprises a bore provided with an internal thread, and wherein the fixation screw further comprises an external thread adapted to engage said thread of the bore of the fixture, and wherein the length of the fixation screw is adapted such that the external thread of the fixation screw is positioned coronally to the thread of the bore of the fixture in the intermediate position. Thus, the fixation screw may not engage the thread of the fixture until the indexing means mate. Hereby, the intermediate position provides for the possibility to allow the dental component to rotate along with the fixation screw since the dental component, in the intermediate position, is rotationally free relative the fixture. That is, the fixation screw is not able to fixate the dental component to the fixture since the fixation screw may not engage the thread of the fixture in the intermediate position.

According to at least one example embodiment, the exterior of the dental component is arranged to be in contact with the interior of the fixture, while the interior of the dental component is arranged to be in contact with the fixation screw. Hence, in this embodiment, the dental component comprises an internal bore arranged to receive the fixation screw.

According to at least one example embodiment, the length of the fixation screw is adapted such that the external thread of the fixation screw may engage the thread of the bore of the fixture when the fixture and the dental component are arranged in the engaged position. In this way, the dental component may freely rotate until it is in the engaged position. In the engaged position, the dental component is rotationally locked in relation to the fixture by means of the indexing means and the force entailing the interconnection between the dental component and the fixation screw (e.g. frictional force) is overcome. That is, in the engaged position when the fixation screw is able to engage the threaded bore of the fixture the dental component is rotationally locked in relation to the fixture by means of the indexing means and thus, the force entailed by the threading is greater than the force entailed by the interconnection between the dental component and the fixation screw. Hereby, the external thread of the fixation screw may engage the threaded bore of the fixture. On the contrary, in the intermediate position, the dental component and the fixation screw are in contact with, but not engaged with, each other. That is, in the intermediate position, the dental component may rotate along with the fixation screw, and the threaded portion of the fixation screw is not allowed to mate with the thread of the bore of fixture.

If the fixation screw is allowed to engage the threaded bore of the fixture when the dental component and the fixture are in the intermediate position, the dental component will be fixated to the fixture by means of the fixation screw in an axially incorrect position. By adapting the length of the fixation screw such that the fixation screw may engage the threaded bore of the fixture in the engaged position, and not in the intermediate position, such erroneous axial positions may be avoided.

According to at least one example embodiment, the fixation screw comprises a non-threaded portion located coronally of a threaded portion. In this way, the threaded portion of the fixation screw may be configured and dimensioned to mate with the threaded bore of the fixture while the interior of the non-threaded portion may be arranged such that it may receive a driver or any other object suitable for applying a torque and an axial force directed in the apical direction of the dental implant set to the fixation screw.

According to at least one example embodiment, a dental implant set is provided wherein the first indexing means comprises indexing depressions extending in the radial direction from a first surface of the fixture and the second indexing means comprises indexing projections extending in the radial direction from a second surface of the dental component, and wherein the indexing depressions and projections are distributed along the circumference of the first and second surfaces of the fixture and the dental component respectively, such that the dental component can only mate in certain specific rotational orientations with respect to the fixture.

Owing to this, a various number of correct rotational orientations may be provided by a suitable placement of corresponding indexing projections and depressions. For example, according to at least one example embodiment, the corresponding indexing projections and depressions may be arranged such that four rotational orientations allow mating of the dental component with the fixture. Hereby, the fixation screw together with the dental component may have to rotate 89° before the dental component may move in the apical direction and thereby achieve mating of the dental component with the fixture. The dental component may move in the apical direction e.g. due to gravity or by an axial force directed in the apical direction of the dental implant set being applied by the user.

A rotational orientation where the indexing projections and depressions do not mate implies that the dental component and the fixture are in the intermediate position. In the intermediate position, the dental component is in a first axial position. A rotational orientation where the indexing projections and depressions mate implies that the dental component and the fixture are in the engaged position. In the engaged position, the dental component is in a second axial position which may be different to the first axial position. That is, the engaged position may entail a different axial position of the dental component compared to the axial position of the dental component in the intermediate position.

Hereby, according to at least one example embodiment, at least two axially spaced, as seen in a coronal-apical direction, relative positions between the dental component and the fixture are possible, one position occurring in at least one rotational orientation wherein the dental component engages the fixture in an engaged position, and at least one position occurring in at least one rotational orientation wherein the dental component and the fixture are in contact with, but not engaged with, each other in an intermediate position.

According to at least one example embodiment, in the intermediate position, the third contacting surface is provided by a portion of the second indexing means of the dental component. According to at least one example embodiment, in the intermediate position, the fourth contacting surface is provided by a portion of the first indexing means of the fixture. According to at least yet another example embodiment, in the intermediate position, the second indexing means of the dental component rests on the first indexing means of the fixture. For example, the second indexing means may be designed as rib portions while the first indexing means may be designed as a surrounding wall portion or as a shelf. Thus, according to at least one example embodiment, in the intermediate position, the rib portions of the dental component rest on the surrounding wall or shelf of the fixture. Of course, other shapes of the indexing means are conceivable.

According to at least one example embodiment, a dental implant set is provided wherein the dental component further comprises at least one first indexing projection having an apical end, and at least two second indexing projections, each one having an apical end, and wherein the fixture further comprises at least one first indexing depression having a coronal end, and at least two second indexing depressions, each one having a coronal end, wherein the apical ends of said at least two second indexing projections are located apically of the apical end of the first indexing projection and/or the coronal ends of said at least two second indexing depressions are located coronally of the coronal end of the first indexing depression, wherein the first and second indexing projections and the first and second indexing depressions are distributed along the circumference of the dental component and the fixture, respectively, in such way that the dental component can only mate in one rotational orientation with respect to the fixture, and wherein the first indexing projection is only enabled to mate with the first indexing depression after said at least two second indexing projections have mated with said at least two second indexing depressions.

According to this example embodiment, the corresponding indexing projections and depressions are arranged such that only one rotational orientation allows mating of the dental component with the fixture. Thus, the fixation screw together with the dental component may have to rotate 359° before it can move in the axial direction and thereby mate with the fixture. The movement in the axial direction may be achieved by either gravity or by an axial force being applied by the user in the apical direction of the dental implant set.

Since the at least two second indexing projections are located coronally of the first indexing projection, the at least two second indexing projections will mate with the corresponding indexing depression before the first indexing projection mates with the corresponding first indexing depression. Also, by having the at least two second depressions configured and dimensioned to only enable mating with the at least two second projections, erroneous mating of the indexing projections and depressions is avoided. Thus, the dental component may rotate along with the fixation screw until the indexing projections and indexing depressions correctly mate, i.e. until the engaged position occurs. Erroneous mating of the indexing projections and indexing depression could otherwise result in that the dentist would have to withdraw the dental component and retry to find a correct mating position.

According to at least one example embodiment, the first indexing means comprises the at least one first indexing depression and the at least two second indexing depressions. According to at least one example embodiment, the second indexing means comprises the at least one first indexing projection and the at least two second indexing projections.

According to at least a second aspect of the present invention, a method is provided for the connection of a dental component to a fixture having first indexing means by means of a fixation screw, the dental component having second indexing means and being arranged to engage the fixture in an engaged position when the first and second indexing means mate, said method comprising the steps of positioning the dental component in an intermediate position in which the dental component and the fixture are in contact with each other but the first and second indexing means do not mate, and applying a torque and an axial force to the fixation screw and thereby rotate the fixation screw in relation to the fixture, wherein the dental component rotates accordingly.

Hereby, the user can easily position the dental component and the fixation screw and then, by using one hand only, rotate the fixation screw by applying a torque and an axial force directed in the apical direction of the dental component and the fixation screw, thereby enabling the first and second indexing means to mate. Effects and features of this second aspect of the present invention are largely analogous to those described above in connection with the first aspect of the invention.

According to at least one example embodiment, a first torque may be transferred from the fixation screw via a first pair of contacting surfaces to the dental component, and a second torque may be transferred from the dental component via a second pair of contacting surfaces to the fixture, wherein the maximum capacity of transferring torque at said first pair of contacting surfaces being larger than the maximum capacity of transferring torque at said second pair of contacting surfaces, thereby allowing the dental component to rotate with the fixation screw.

According to at least one example embodiment, the method may be executed by means of an implant set according to any one of the exemplary embodiments of the first aspect of the present invention. In that case, the first pair of contacting surfaces may be constituted of the first and second contacting surfaces and the second pair of contacting surfaces may be constituted of the third and fourth contacting surfaces.

According to at least a third aspect of the present invention, a method for preparing a dental implant set is provided. The method comprises the steps of: providing a fixture having first indexing means, and providing a dental component having second indexing means and being arranged to engage the fixture in an engaged position where the first and second indexing means mate and being arranged to not engage the fixture in an intermediate position where the first and the second indexing means do not mate but where the dental component and the fixture are in contact with each other, and providing a fixation screw for connecting said dental component to said fixture, and providing a first contacting surface of the fixation screw to abut a second contacting surface of the dental component and a third contacting surface of the dental component to abut a fourth contacting surface of the fixture, and providing said contacting surfaces such that when a torque and an axial force directed in the apical direction of the fixation screw is applied to the fixation screw, in the intermediate position, the fixation screw rotates in relation to the fixture and the dental component rotates accordingly.

According to at least one example embodiment, the method may be utilized for preparing an implant set according to any one of the exemplary embodiments of the first aspect of the present invention.

According to at least one example embodiment, the method further comprises providing the contacting surfaces such that the maximum capacity of transferring torque between said first and second contacting surfaces is larger than the maximum capacity of transferring torque between said third and fourth contacting surfaces.

According to at least one example embodiment the method may be utilized for preparing an implant set wherein the fixture further comprises an axis, and at least one of the first and second contacting surfaces is provided to form a smaller angle to the axis than at least one of the third and fourth contacting surfaces.

According to at least one example embodiment, the method further comprises providing mating portions of the first and second contacting surfaces to form a first contacting area and providing mating portions of the third and fourth contacting surfaces to form a second contacting area.

According to at least one example embodiment, the method further comprises providing at least one of the contacting surfaces to have different surface characteristics from the others in order to modify the friction between the first and second contacting surfaces or between the third and fourth contacting surfaces.

According to at least one example embodiment, the method further comprises coating at least one of the contacting surfaces with a material in order to modify the friction between the first and second contacting surfaces or between the third and fourth contacting surfaces.

According to at least one example embodiment, the method further comprises surface treating at least one of the contacting surfaces in order to modify the friction between the first and second contacting surfaces or between the third and fourth contacting surfaces.

The described dental implant set is particularly suitable and intended for medical and dental applications, and is particularly suited for use in the field of dental implant dentistry and related applications. Dental implants are used to support the restoration of missing teeth. Dental implant fixtures are surgically implanted by a dentist. These dental implants typically will be provided with abutments and crowns; that is, following successful dental implantation of dental implant fixtures into the jaw of the patient, complementary components including abutments and crowns will be affixed to the dental implanted fixtures to provide the patient with a restoration of the patient's natural teeth.

A dental implant may comprise a dental fixture and a superstructure, such as an abutment.

A dental fixture is for use as the anchoring member of a dental prosthesis. To this end, the dental fixture is insertable into a pre-prepared bore hole in the bone tissue of a jawbone (maxilla or mandible) at a site where the dental prosthesis is required. The dental fixture is normally rotated into the bore hole.

For screw-type dental fixtures the bore hole may be provided with internal threads in advance or may be left un-tapped with the dental fixture provided with a self-tapping capacity, e.g. by the provision of one or more axially-extending cutting recesses, edges or notches, etc in the fixture thread. For instance, an apical end portion of the fixture may be provided with 2-4 cutting recesses, such as 3 cutting recesses. Other number of cutting recesses are readily conceivable.

A superstructure for connecting a prosthetic part to the fixture may comprise an abutment, spacer or other transmusosal component which engages to the dental fixture to bridge the gingiva overlying the maxilla or mandible. The prosthetic part, e.g. a crown, bridge or denture may be secured to the abutment. There are various other forms that the superstructure can take. For instance, the prosthetic part may be secured directly to the dental fixture. A dental implant may thus comprise an abutment connected to the dental fixture, or the dental fixture without an abutment.

The term "coronal" is here and throughout this application used to indicate a direction towards a head end or trailing end of the dental implant. For instance, in a situation where an abutment is connected to a dental fixture, the coronal direction of the abutment would be a direction towards the part of the abutment being directed away from the fixture. Conversely, the term "apical" indicates a direction towards an insertion or leading end of the component. Thus, apical and coronal are opposite directions. Furthermore, the terms "axial", "axial direction" or "axially" are used throughout this application to indicate a direction taken from the coronal end to the apical end, or vice versa. The terms "radial", "radial direction" or "radially" indicate a direction perpendicular to the axial direction.

A blind bore or socket may extend apically into the fixture body from the coronal end to an end surface in-between the apical and coronal ends of the fixture body for a superstructure to be secured to the fixture. The socket may comprise an internally-threaded section for screw connection of the superstructure to the fixture. A rotational lock for the superstructure may be provided in the socket, such as an internal polygonal side wall, e.g. hexagonal, or alternatively one or more protrusions from or indentation in the wall of the socket. A section of the socket, such as the coronal section, may be tapered towards the apical end. The tapered section is suitably arranged coronally of the internally-threaded section.

The fixture may be used in a one stage procedure or a two stage procedure. In a one stage procedure a healing or temporary abutment is connected to the fixture to form the gingival tissue, and after a healing period the healing or temporary abutment is replaced by a permanent abutment. For a two stage procedure the fixture is provided with a healing cap and the gingival tissue is sutured over the fixture and healing cap, and after a healing period the tissue is opened up and an abutment is connected to the fixture after removal of the healing cap.

A conceivable alternative to having an abutment connected to the fixture is to have a one-piece dental implant, wherein a portion of the dental implant is embedded in bone tissue, while another portion of the dental implant extends from the bone tissue across the gingiva.

The fixture may have a conically tapering end portion which tapers towards the coronal end. The axial extent of this coronal end portion is small compared to the total length of the fixture, as an example no more than 4% of the total length, such as in the range of 1.5%-3.7%. The coronal end portion may suitably be provided without a threaded surface, e.g. having a smooth or a roughened (such as blasted) surface.

The fixture may have a substantially flat coronal end surface which is perpendicular to the longitudinal axis of the fixture. Alternatively, the coronal end surface may have a sloped contour relative to the longitudinal axis of the fixture, e.g. such that when positioned within the jawbone the length of the fixture is larger on a lingual side and shorter on a buccal side of the fixture. Another alternative is a saddle-shaped or wave-like coronal end surface.

The length of the dental fixture may be in the range of 5-19 mm, depending on the clinical situation. The outer diameter of the dental fixture may suitably be in the range of 2-6 mm, such as 3-5 mm.

The fixture may be substantially cylindrical or slightly tapering from the coronal end towards the apical end. If the fixture has a slight tapering, the core of the fixture and the outer periphery defined by e.g. thread tops may have the same or different angle of taper. Furthermore, the core of the fixture may be cylindrical while the thread tops describe a conicity or, conversely, the core of the fixture may be tapered while the thread tops describe a generally cylindrical geometry. Alternatively, the fixture may comprise a combination of one or more cylindrical and/or one or more tapering portions. Thus, one or more portions of the fixture may have e.g. thread tops lying in a common imaginary cylindrical surface, which cylindrical surface is parallel with the longitudinal axis of the fixture. Alternatively or additionally, one or more portions of the fixture may have thread tops lying in an imaginary conical surface which in the apical direction is tapering towards the longitudinal axis.

The externally threaded fixture may comprise one or more thread spirals.

The term "pitch" is used to indicate the axial distance between adjacent tops of a threading. The term "lead" is used to indicate the distance advanced parallel to the longitudinal axis when the fixture is turned one revolution, i.e. it corresponds to the pitch multiplied with the number of thread spirals. For a single thread spiral having a constant pitch, the lead is equal to the pitch; for a double thread spiral, the lead is twice the pitch.

The term "microthread" is used to indicate a thread having a height which is no greater than 0.2 mm. According to at least one example embodiment, the fixture is provided with microthreads having a height in the range of 0.02-0.2 mm, such as 0.05-0.015 mm, for instance 0.1 mm. The term "macrothread" is used to indicate a thread having a height which is greater than 0.2 mm. According to at least one example embodiment, the fixture is provided with macrothreads having a height in the range of 0.25-0.35 mm, such as 0.3 mm.

Suitably, microthreads may be located coronally of macrothreads. For instance, microthreads may be arranged to engage dense cortical bone and macrothreads may be arranged to engage porous spongious/cancellous bone. The lead of a microthread suitably corresponds to the lead of a macrothread. The macrothread pitch may, as an example, be 2-4 times, such as 3 times, the pitch of the microthreads. The pitch (top-to-top spacing) at a fixture portion provided with microthreads may be around 0.10-0.30 mm, for instance 0.20-0.24 mm. The pitch (top-to-top spacing) at a fixture portion provided with macrothreads may be around 0.30-0.90 mm, for instance 0.60-0.72 mm.

Microthreads can be regarded as defined, oriented roughness. A non-oriented roughness having smaller dimensions, for instance obtained by blasting, etching, etc., may be superimposed on microthreads as well as on macrothreads.

A thread profile may comprise two flanks, a top interconnecting said two flanks, a bottom formed between two adjacent threads, said flanks forming an acute angle v with a plane which is perpendicular to the fixture axis and which angle v lies in a plane containing the extension of the fixture axis, said profile further having a height D. The top may be curved and may have a top radius. Suitably, for $10° \leq v < 35°$, the top radius is greater than $0.4 \times D$ and, for $35° \leq v < 55°$, the top radius is greater than $0.2 \times D$.

BRIEF DESCRIPTION OF THE DRAWINGS

FIG. 6a is a top view of the fixture in FIG. 6

FIG. 6b is a bottom view of the dental component in FIG. 6.

FIG. 6c is a bottom view of the dental component in FIG. 6.

DETAILED DESCRIPTION OF THE DRAWINGS

Figure 1:
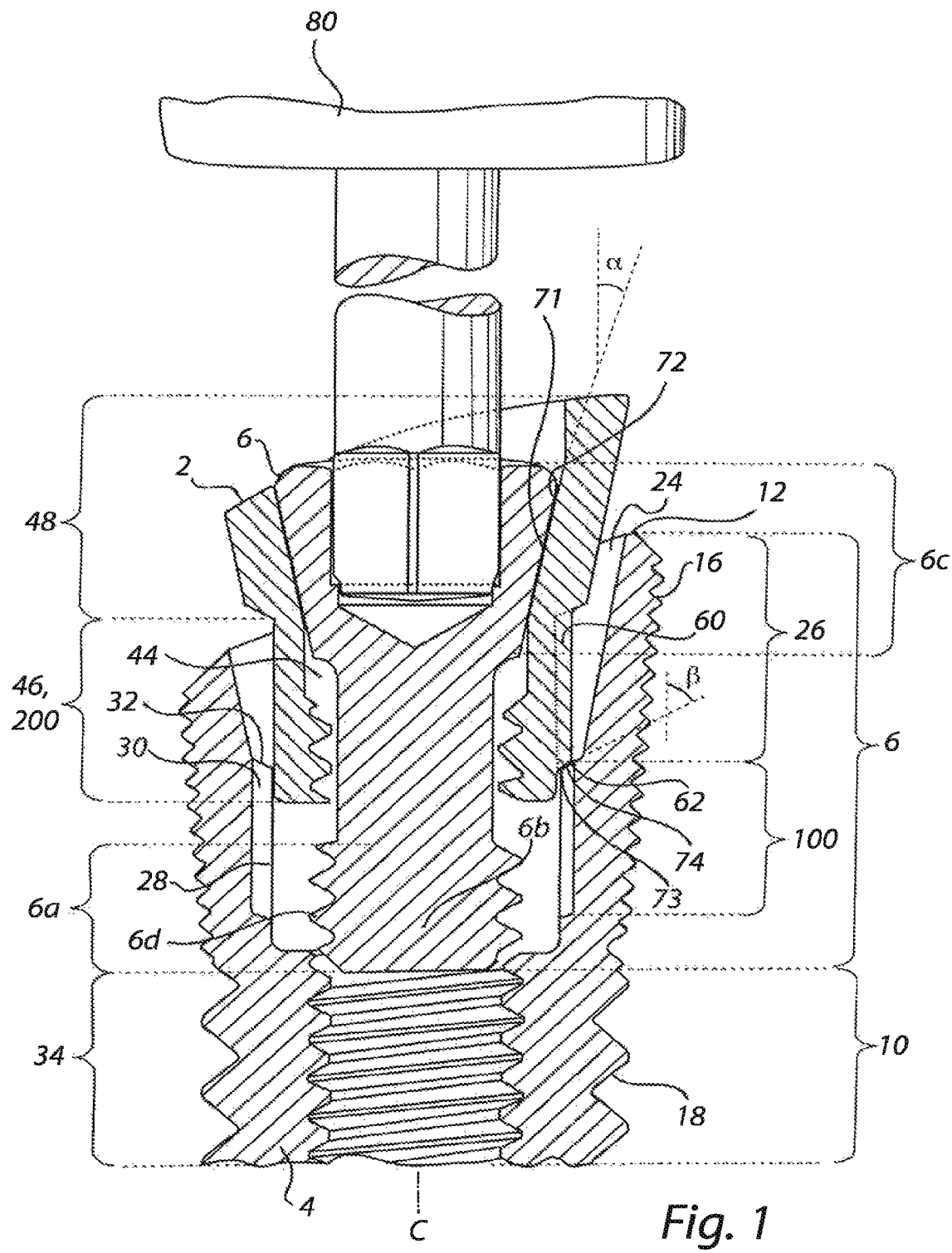
FIG. 1 illustrates an implant set according to at least one example embodiment of the present invention.

FIGS. 1, 2, 3, 4, 5 and 6 illustrate various dental implant sets 1 comprising various dental components 2, 3a-3c, each dental implant set 1 further comprises a fixture 4 and a fixation screw 6, according to at least some example embodiments.

Figure 2:
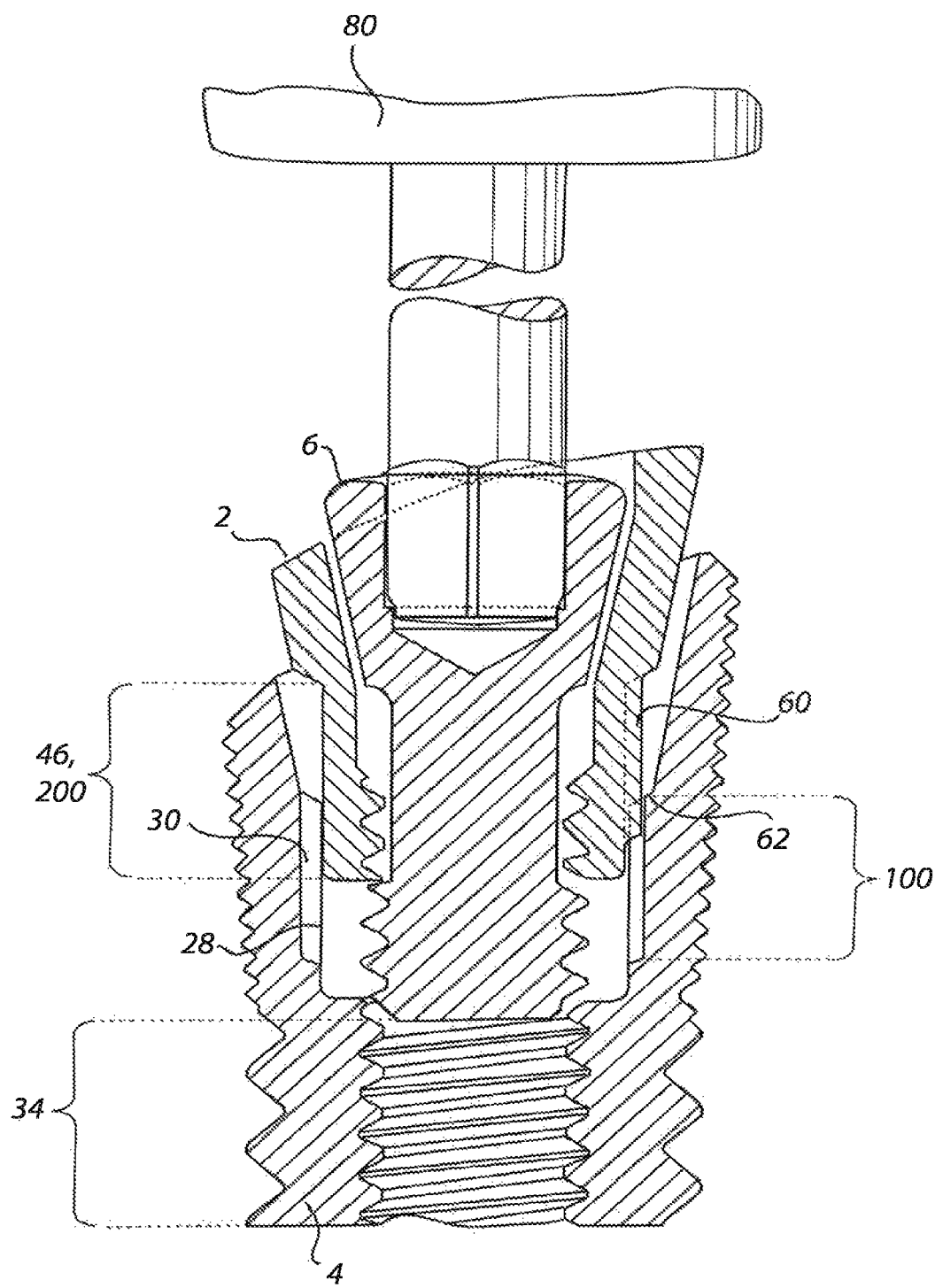
FIG. 2 illustrates an implant set according to at least one example embodiment of the present invention.
Figure 3:
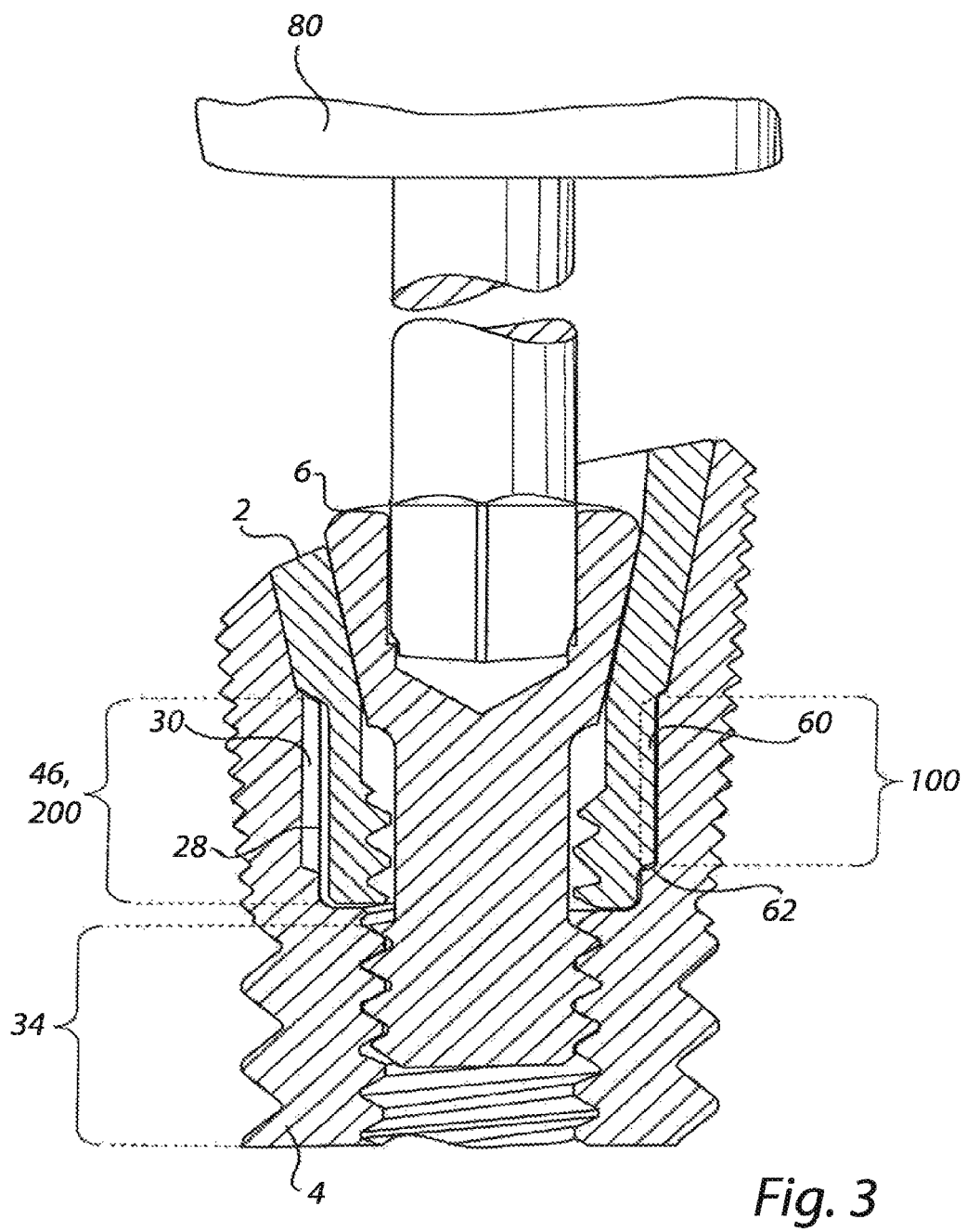
FIG. 3 illustrates an implant set according to at least one example embodiment of the present invention.

FIGS. 1-3 and 6, illustrate a dental implant set 1 during installation of a dental component, such as a healing cap 2 or an abutment 3b, 3c, to a fixture 4, 104 by means of a fixation screw 6. The fixation screw may be driven by a driver 80 as illustrated in FIGS. 1-3. The fixation screw 6 is adapted to be joined to the dental component 2, 3b, 3c in order to fasten the dental component 2, 3b, 3c to the fixture 4, 104. That is, the dental component 2, 3b, 3c is arranged to be in contact with both the fixation screw 6 and the fixture 4, 104.

In FIGS. 1-3 and 6, the fixture 4, 104 has a coronal portion 8, intended to engage the cortical bone tissue, extending apically from a coronal end 12 of the fixture 4, 104, and an apical portion 10, intended to engage the cancellous bone tissue, extending coronally from an apical end 14 (only shown in FIG. 6) of the fixture 4, 104. The apical portion 10 may have a conicity tapering towards the apical end of the fixture 4, 104 to ease insertion of the fixture 4, 104 into a bore-hole in the jawbone. In the illustrated example, the coronal portion 8 is apically tapered, it may however also have a straight configuration. The coronal end 12 of the fixture 4, illustrated in FIGS. 1-3, has a sloped configuration and the coronal end 12 of the fixture 104, illustrated in FIG. 6, has a straight configuration.

The coronal portion 8 is herein illustrated as having an exterior at least partly provided with relatively small threads, or microthreads 16, e.g. having three thread spirals, although another number is conceivable, such as 1, 2, 4 or more spirals. Although microthreads 16 have been illustrated, according to at least an alternative example embodiment the coronal portion 8 is at least partly provided with relatively large threads, or macrothreads 18, similarly to the apical portion 10, either as a separate thread spiral or as a continuation of the thread spiral at the apical portion 10. According to at least another alternative example embodiment, instead of microthreads 16, the coronal portion 8 may be provided with a plurality of annular ridges, which to the naked eye could give the same visual appearance as microthreads 16. Other conceivable alternatives are circumferential lines of beads or non-oriented/randomly provided projections such as bulges.

In the illustrated example embodiment, the macrothreads 18 at the apical portion 10 has the same lead as the microthreads 16 at the coronal portion 8. However, the pitch of the macrothreads 18 is three times the pitch of the microthreads 16, since the microthreads 16 comprise three thread spirals.

The apical portion 10 comprising macrothreads 18 is herein illustrated as having one thread spiral, however, the apical portion 10 may alternatively have two or more thread spirals.

The length of the herein illustrated coronal portion 8 may be about 1-2 mm, such as 1.5 mm. However, shorter or longer lengths are readily conceivable. The relative length of the coronal portion 8 may also be selected from a wide range, such as 5-50% of the total length of the fixture 4, 104, e.g. 10-20%.

The coronal portion 8 comprises a tapering end portion 20, which tapers towards the coronal end 12 of the fixture 4. The tapering end portion 20 is no more than 4% of the total length of the fixture 4, 104. The surface of the tapering end portion 20 may be non-threaded, either smooth or blasted (or otherwise roughened).

Cutting recesses or grooves (not shown) extend coronally from the apical end of the fixture 4, 104. The number of cutting recesses may be one or more, such as two, three or four cutting recesses, suitably symmetrically positioned about the circumference of the apical end of the fixture 4, 104 for self-tapping of the fixture 4, 104 when being screwed/rotated into the bore-hole provided in the maxilla or mandible.

Figure 6:
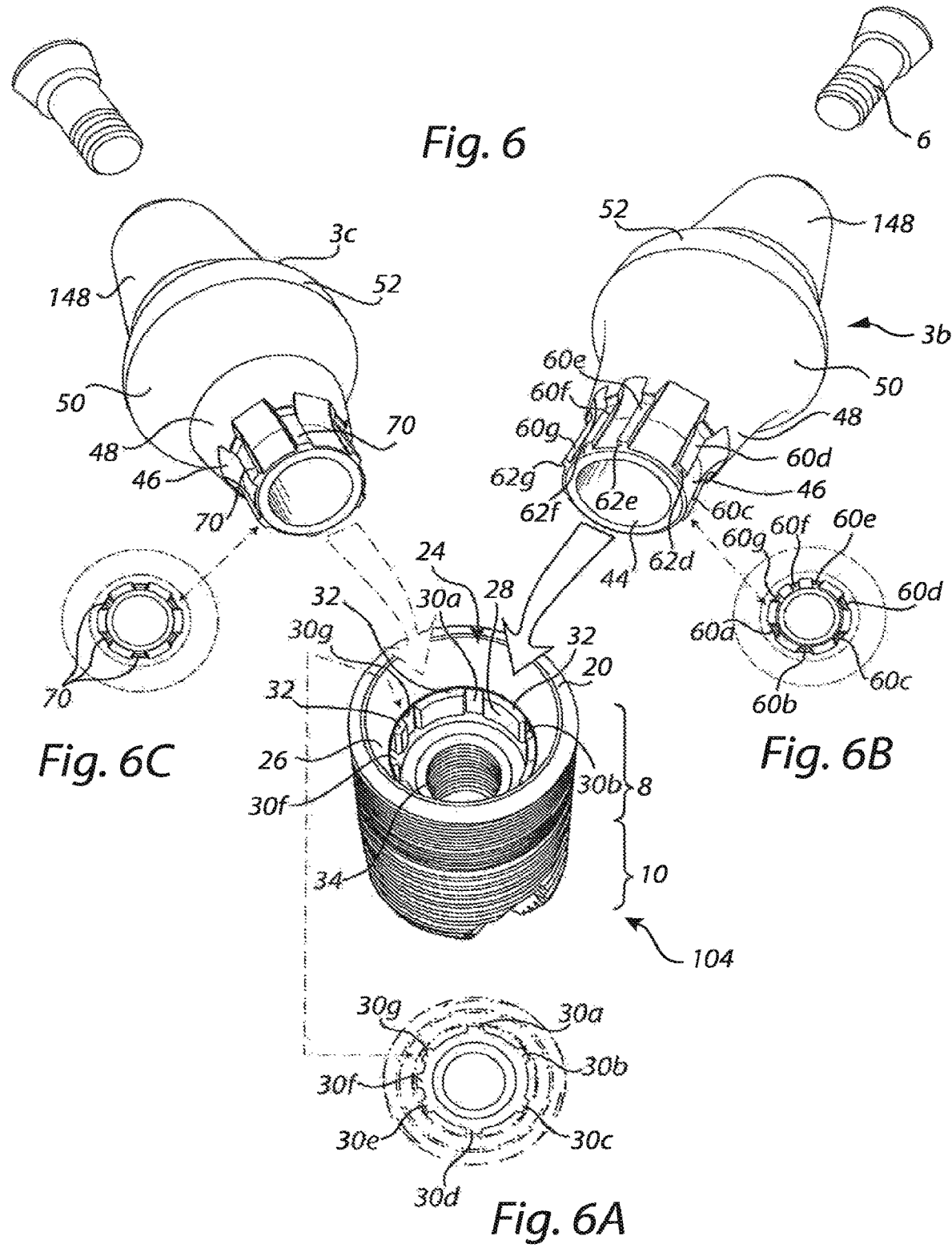
FIG. 6 illustrates dental components according to example embodiments of the present invention, wherein one dental component is to be connected to a fixture in a specific rotational orientation with respect to the fixture and one other dental component which may be arranged in a number of different rotational orientations with respect to the same fixture.

A socket 24 having an open end in the coronal end 12 of the fixture 4, 104 is provided. The socket 24 extends apically into the fixture 4, 104 and is configured and dimensioned for receiving the dental component, such as the healing cap 2 as illustrated in FIGS. 1-3 and the abutment 3b, 3c as illustrated in FIG. 6. The socket 24 is further provided with an internally threaded apical section 34 intended for engagement with the fixation screw 6. The healing cap 2 in the embodiment shown in FIGS. 1-3, has a sloped configuration and will, after being properly fixated to the fixture 4 by means of the fixation screw 6, level with the fixture 4 and the surrounding bone. The abutment 3b illustrated in FIG. 6 has a sloped configuration and the abutment 3c illustrated in FIG. 6 has a symmetrical configuration. The abutments 3b, 3c will extend through the gingiva of the patient once properly installed in the fixture 104.

Although various alternative configurations are conceivable, the socket 24 is herein illustrated as having a conical coronal section 26 and a substantially cylindrical intermediate wall section 28 located apically of the coronal section 26. Indexing elements 30, herein illustrated as radially extending indexing depressions 30, of which two are seen in FIGS. 1-3 are provided in the intermediate wall section 28. The indexing depressions 30 are herein illustrated as continuations of the conical coronal section 26 but are not apically tapering. Thus, in the illustrated examples in FIGS. 1-3 and 6, the inclination of the conical coronal portion 26 and the indexing depressions 30 are different and connected by means of a bending portion. As an alternative, the indexing depressions 30 may be tapering. Further as an alternative, the intermediate wall section 28 may be substantially conical. Between the indexing depressions 30, the intermediate wall section 28 is connected to the conical coronal section 26 by shelves 32.

The combination of the indexing depressions 30, the intermediate wall section 28 and the shelves 32 is referred to as first indexing means 100 of the fixture 4. The indexing means 100 are further described in relation to FIG. 6.

In FIGS. 1-3, the healing cap 2 comprises an engagement portion 46 intended to engage with the indexing depressions 30 and the intermediate wall section 28 of the fixture 4. The engagement portion 46 is herein illustrated as having a generally cylindrical enveloping surface, although other enveloping surfaces, such as tapering, would be a conceivable alternative. The healing cap 2 further comprises a conical coronal portion 48 which extends coronally of the engagement portion 46. Similar, in FIG. 6, the abutments 3b, 3c comprises a respective engagement portion 46 intended to engage with the indexing depressions 30 and the intermediate wall section 28 of the fixture 104. The engagement portion 46 is herein illustrated as having a generally cylindrical enveloping surface, although other enveloping surfaces, such as tapering, would be a conceivable alternative. The abutments 3b, 3c further comprises respective conical coronal portions 48 which extends coronally of the engagement portion 46.

In FIGS. 1-3, the healing cap 2 is further provided with a through-hole 44 extending from a coronal opening located at a coronal end of the healing cap 2 to an apical opening located at the apical end of the healing cap 2. The through-hole 44 is adapted to receive the fixation screw 6. The abutments 3b, 3c in FIG. 6 are each provided with a similar trough-hole, fulfilling the same purpose.

Indexing elements 60, herein illustrated as radially extending indexing projections 60, of which one is seen in FIGS. 1-3, are located at the cylindrical enveloping surface of the engagement portion 46. Each indexing projection 60 has an apical end 62 here illustrated as a shelf-like recess in the engagement portion 46.

The combination of the indexing projections 60 with their apical ends 62 and the intermediate wall sections of the cylindrical enveloping surface located between the indexing projections 60 of the engagement portion 46 is referred to as second indexing means 200 of the healing cap 2. The indexing projections 60 will be described in greater detail below in relation to FIG. 6.

The fixation screw 6 comprises a threaded portion 6a having a core provided with an external thread 6d. Furthermore, the fixation screw 6 is provided with a shaft 6b and a head 6c, wherein the threaded portion 6a is provided at an apical portion of the shaft 6b. According to at least the embodiments shown in FIGS. 1-3 the circumference of the head 6c, located coronally of the threaded portion 6a is apically tapered and thus forming an angle to a longitudinal central axis C of the fixture. In FIG. 1 the circumference of the head 6c is forming a first contacting surface 71 intended to be in contact with a second contacting surface 72 provided here by the interior of the conical coronal portion 48 of the healing cap 2, once the healing cap 2 is connected to the to the fixture 4. The first contacting surface 71 is forming an angle α of about 11° in relation to the axis C of the fixture 4. The healing cap 2 with the corresponding second contacting surface 72 is forming a seat for receiving the first contacting surface 71 of the fixation screw 6. The second contacting surface 72 of the healing cap 2 forms an angle α of about 11° in relation to the axis C of the fixture. Thus, according to at least the embodiment shown here, when the fixation screw 6 is inserted into the healing cap 2, the first contacting surface 71 will come into contact with the second contacting surface 72 of the healing cap 2. The fixation screw 6 is adapted to extend through the through-hole 44 of a dental component and engage the internal thread 34 of the fixture 4, 104 in order to fixate the dental component to the fixture 4.

In FIG. 1 the apical ends 62 of the indexing projections 60 of the healing cap 2 is forming a third contacting surface 73 intended to be in contact with a fourth contacting surface 74 provided here by the shelf 32 of the fixture 4. The third contacting surface 73 is forming an angle β of about 70° in relation to the axis C of the fixture. The fourth contacting surface 74 of the fixture 4 forms an angle β of about 70° in relation to the axis C of the fixture 4.

As is also illustrated in FIGS. 1-3, a part of the apical end of the through-hole 44 is provided with threads 47, configured and dimensioned to engage with the fixation screw 6 in order for the healing cap 2 and the fixation screw 6 to be pre-connected to each other prior to being connected to the fixture. The dimensions of the head 6c of the fixation screw 6 and the corresponding dimension of the fixation screw receiving portion of the healing cap 2 will, together with an apical end of the threads 47 and a coronal end of the threads 6d of the fixation screw 6, prevent the fixation screw 6 and the healing cap 2 from being separated once the fixation screw 6 has been threaded through the healing cap 2. Hereby, the fixation screw 6 and the healing cap 2 will be held together during installation of the healing cap 2 to the fixture 4.

The dental implant set 1 will now be further described in use. FIGS. 1-3 show various stages of the installation process of the healing cap 2 to the fixture 4. The fixture 4 has here previously been inserted into a bore hole, arranged in bone tissue while the healing cap 2 and the fixation screw 6, which are pre-connected to each other, has been placed into the fixture 4, as can be seen in FIG. 1. Furthermore, in FIG. 1, an intermediate position is illustrated in which the fixation screw 6 and the healing cap 2 is in contact but where the first and second indexing means 100, 200 do not mate, while in FIGS. 2-3, an engaged position is illustrated in which the first and the second indexing means 100, 200 mate and engages each other.

As can be seen in FIG. 1 the apical end 62 (the shelf-like recess) of the indexing projection 60 of the healing cap 2 rests on the shelf 32 of the first indexing means 100 of the fixture 4. Thus, according to at least this example embodiment the third contacting surface 73 of the healing cap 2 is provided by the apical end 62 of the indexing projection 60, and is in contact with the fourth contacting surface 74 of the fixture 4, here provided by the shelf 32. Hereby, the healing cap 2 and the fixture 4 are in contact with each other but the first and second indexing means 100, 200 do not mate. This position is referred to as the intermediate position.

When the healing cap 2 is rotated relative the fixture 4, the indexing projection 60 and its apical end 62 will move away from the shelf 32 of the fixture 4 and eventually, in one or more specific rotational orientations, meet an indexing depression 30 into which the indexing projection 60 is configured and dimensioned to fit. In previous implant sets, the dentist would first have to rotate the healing cap by one hand until it was correctly oriented and thereafter tighten the implant screw to the fixture. However, according to the present invention, the implant set 1 is provided such that the torque applied by the driver 80 to the fixation screw 6 is transferred from the fixation screw 6 to the healing cap 2 via the first and second contacting surfaces 71, 72 and from the healing cap 2 to the fixture 4 via the third and fourth contacting surfaces 73, 74, in such a manner that the maximum torque that can be transferred via the first and second contacting surfaces 71, 72 is larger than the maximum torque that can be transferred between the third and fourth contacting surfaces 73, 74. By this, the healing cap 2 will rotate together with the fixation screw 6 in the intermediate position. This will be further explained below. When the indexing projections 60 are fit into the corresponding indexing depressions 30, the first and second indexing means 100, 200 mate. That is, the healing cap 2 will be able to move axially in the apical direction of the fixture and engage with the fixture 4 in an engaged position. The axial movement of the healing cap 2 is due to an axial force being applied by the user in the apical direction of the dental implant set or gravity. This can be seen in FIGS. 2-3 where the indexing projections 60 is fit into an indexing depressions 30. Various axial positions of the dental component relative the fixture are shown; in FIG. 2 the healing cap 2 and the fixture 4 are in an early stage of the engaged position since the indexing projections 60 are only slightly fitted into the indexing depressions 30 while FIG. 3 show a late stage of the engaged position where the indexing projections 60 are fully inserted into the indexing depressions 30.

Furthermore, as is also illustrated in FIGS. 1-3, the length of the fixation screw 6 is chosen such that the threads 6d cannot engage the thread 34 when the healing cap is in the intermediate position in FIG. 1, while it is able to engage it in the different stages of the engaged position illustrated in FIGS. 2-3. After the healing cap 2 has been arranged in the desired rotational position relative the fixture 4 such that the indexing projections 60 engages with the indexing depressions 30 the healing cap 2 is rotationally locked relative the fixture 4. This means that, in the engaged position, the healing cap 2 is not able to rotate together with the fixation screw 6, as in the intermediate position, due to the rotational lock provided by the indexing means 100, 200. Hereby, the fixation screw 6 may be tightened and the healing cap 2 fixated to the fixture 4. As can be seen in FIG. 3, in the fully engaged position, the conical coronal portion 26 of the fixture 4 is forming a seat for the exterior of the conical coronal portion 48. Thus, the shape of the conical coronal portion 48 is conical similar to the conical coronal portion 26 of the fixture 4.

Turning back to FIG. 1, it should be noted that the apical end 62 of the indexing projections 60 is still in contact with the shelves 32 of the fixture 4 when the healing cap 2 is rotated relative the fixture 4 in the intermediate position. Thus, a frictional force will counteract the rotation of the healing cap 2 relative the fixture 4.

Furthermore, when rotating the fixation screw 6 a frictional force will counteract the rotation of the healing cap 2. Thus, at least two different frictional forces are affecting the rotation of the fixation screw 6 and the healing cap 2 when rotated together in the intermediate position shown in FIG. 1; a first frictional force between the first contacting surface 71 of the fixation screw 6 and the second contacting surface 72 of the healing cap 2, and a second frictional force between the third contacting surface 73 of the healing cap 2 and the fourth contacting surface 74 of the fixture 4. When the fixation screw 6 is rotated, e.g. by applying a torque by the driver 80, a different torque is allowed to be transferred via the first and second contacting surfaces 71, 72 than via the third and fourth contacting surfaces 73, 74 if the first and the second frictional forces are different, provided everything else equal. That is, the applied torque to the fixation screw 6 is transferred from the fixation screw 6 to the healing cap 2 via the first and second contacting surfaces 71, 72, and from the healing cap 2 to the fixture 4 via the third and fourth contacting surfaces, 73, 74, until the maximum capacity of torque transfer is reached for either one of the pairs of contacting surfaces.

The first frictional force between the first and second contacting surfaces 71, 72 and the second frictional force between the third and fourth contacting surfaces 73, 74 may be altered by different means. For example, a steeper inclination entails a higher frictional force. As can be seen in the example embodiment shown in FIGS. 1-3, the inclination α of the circumference of the head 6c of the fixation screw 6 and the interior of the conical coronal portion 48 providing the first and second contacting surfaces 71, 72 are steeper compared to the inclination β of the apical ends 62 of the indexing projections 60 and the shelf 32 of the fixture providing the third and fourth contacting surfaces 73, 74, respectively. Hereby, assuming other characteristics of the contacting surfaces 71-74 being the same, a larger torque can be transferred between the fixation screw 6 and the healing cap 2 than between the healing cap 2 and the fixture 4. Thus, the healing cap 2 will rotate along with the fixation screw 6 relative the fixture 4 in the intermediate position even though the distance, and thereby the lever, is larger from the axis of the dental fixture to the third and fourth contacting surfaces 73, 74 than from the axis of the dental fixture to the first and second contacting surfaces 71, 72.

Figure 4:
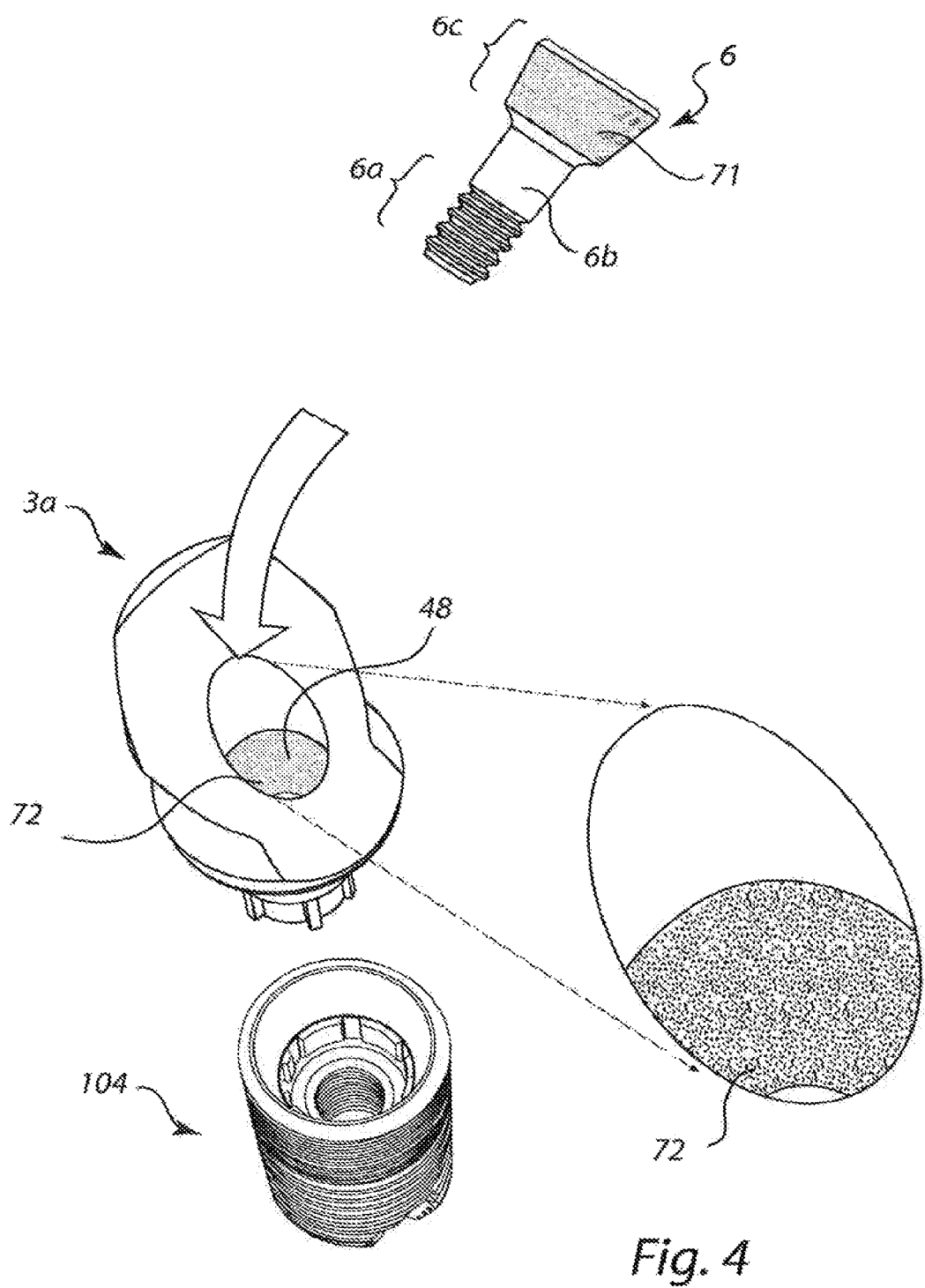
FIG. 4 illustrates surface modifications of components in a dental implant set for obtaining desired friction-affecting properties according to at least one example embodiment of the present invention.
Figure 5:
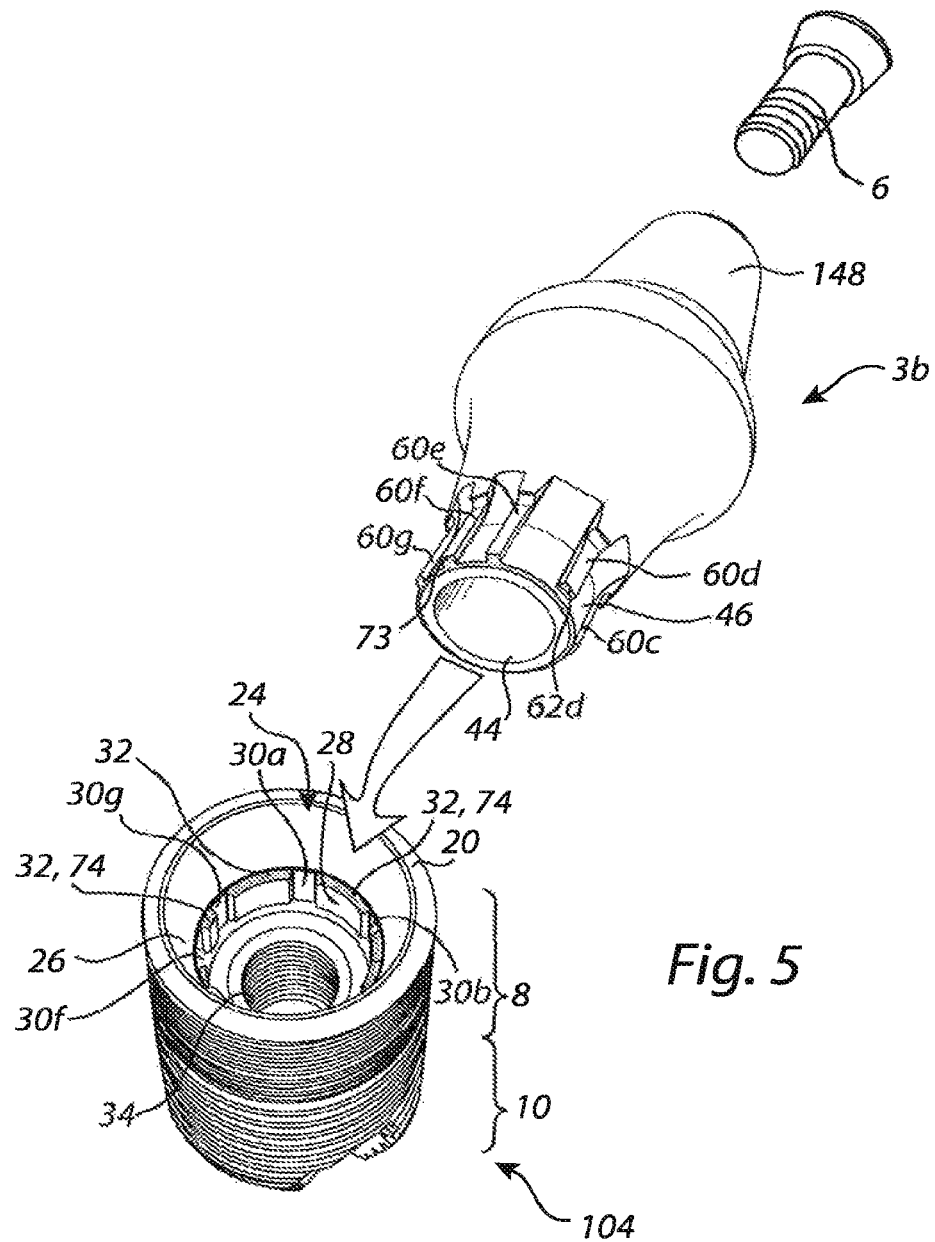
FIG. 5 illustrates surface modifications of components in a dental implant set for obtaining desired friction-affecting properties according to at least one other example embodiment of the present invention.

Rather than, or in addition to, providing dental components 2, 3a, 3b, 4, 6, of the implant set 1 with different angles for the different contacting surfaces 71-74 for achieving different frictional properties, the maximum capacity of torque that can be transferred may also be affected by variations in surface properties, thereby modifying the friction of coefficient between the respective contacting surfaces. Turning to FIGS. 4-5 alternative manners to differentiate the frictional forces between the contacting surfaces 71, 72, 73, 74 for a given axially applied force are illustrated.

The same reference numerals as used in relation to FIGS. 1-3 and 6 denotes corresponding features in FIGS. 4 and 5. For sake of clarity, only features differing from the embodiments described in FIGS. 1-3 and 6 will be elaborated upon in the following description of FIGS. 4 and 5. In FIG. 4 it is illustrated where the fixation screw 6 and the dental component, here illustrated as a custom-shaped abutment 3a, are surface modified for obtaining the desired friction-affecting properties. Another example is illustrated in FIG. 5 where the fixture 4 and the dental component, here illustrated as an sloped abutment 3b, are surface modified for obtaining the desired friction-affecting properties.

Thus, FIG. 4 illustrates an example in which the circumference of the head 6c of the fixation screw 6 has been provided with a surface roughness and similarly, the interior of the conical coronal portion 48 of the abutment 3a has been provided with a surface roughness. The surfaces provided with surface roughness are here indicated by grey-coloured areas. When the fixation screw 6 is inserted into the abutment 3a during and after installation of the abutment 3a to the fixture 4, the circumference of the head 6c is forming the first contacting surface 71 intended to be in contact with the second contacting surface 72 provided here by the interior of the conical coronal portion 48 of the abutment 3a. Hence, the first and second contacting surfaces 71, 72 are provided with a surface roughness to provide for a higher friction than if the contacting surfaces 71, 72 would have been smooth surfaces.

FIG. 5 illustrates an example in which the contacting surfaces 73, 74 between the abutment 3b and the fixture 4 have been provided with some frictional reducing manner. That is, in this embodiment, it is the apical ends 62 of the indexing projections 60 acting as the third contacting surface 73 and the shelves 32 in the socket 24 acting as the fourth contacting surface 74, that have been provided with frictional reducing measures, indicated by the grey-coloured areas, to provide for a lower friction than if the contacting surfaces 73, 74 would have been untreated surfaces.

It should be noted that to achieve a higher friction between the first and second contacting surfaces 71, 72 it is not necessary that both components are provided with the greater surface roughness. Similar, to achieve a lower friction between the third and fourth contacting surfaces 73, 74, it is not necessary that both components are provided with frictional reducing measures. Providing one of the components, e.g. the fixation screw 6 in FIG. 4 with roughened surface 71 while keeping the second contacting surface 72 of the abutment 3a smooth will still result in a higher friction than if both components would have smooth contacting surfaces 71, 72. Of course providing at least one of the third and fourth contacting surfaces 73, 74 with frictional reducing measures, as in FIG. 5, will increase the relative frictional force between that of the first and second contacting surfaces 71, 72 and that of the third and fourth contacting surfaces 73, 74. Hence the maximum capacity of torque transfer to the fixture 4 from the abutment 3a, 3b will be smaller than the maximum capacity of torque transfer to the abutment 3a, 3b from the fixation screw and therefore allowing the abutment 3a, 3b to rotate along with the fixation screw 6 in the intermediate position.

Other surface modification alternatives are of course conceivable for affecting the frictional coefficients. Thus, instead of surface roughening, an alternative would be to provide the contacting surfaces 71-74 with a surface coating, another alternative would be anodization of the contacting surfaces 71-74 (or of the entire components).

In order to clarify the different factors explained above, reference is now made to FIG. 7 which schematically illustrates a dental component and the factors affecting the capacity of torque transfer between different components. The schematic dental component in FIG. 7 corresponds to contacting surface 71 of the fixation screw 6 and has the shape of a regular truncated cone. It is in the following explanation assumed that the force per surface area unit is constant over the cone surface. The lateral area of the contacting surface 71 is $$(R+r)\pi S$$

and the lateral surface area of an infinitesimal element is $$2\left(r + (R-r)\frac{x}{H}\right)\pi\left(\frac{dxS}{H}\right)$$

wherein S is the lateral height of the truncated cone, R and r are the respective radiuses of the respective bases of the truncated cone, x is the distance from the lower base of the cone and H is the total height of the cone. The apically directed force per unit area $F_A$ is $$\frac{F}{((R+r)\pi S)},$$

where F is the force applied by the user. The normally directed force per unit area $F_N$ is $$\frac{F}{((R+r)\sin(\alpha)\pi S)},$$

where α is the angle between the contacting surface 71 and the axis of the dental implant set. The lever L between each unit area and the axis of the dental implant set is $$r + (R-r)\frac{x}{H}.$$

The coefficient of friction between the first and second contacting surfaces is not illustrated in the picture but is denoted μ. The torque is thereby $$T = \int_0^H \left(\frac{F}{(R+r)\sin(\alpha)\pi S}\right)\mu\left(2\left(r+(R-r)\frac{x}{H}\right)\pi\left(\frac{dxS}{H}\right)\right)\left(\left(r+(R-r)\frac{x}{H}\right)\right),$$

i.e. the normally directed force per unit area times the coefficient of friction times the lateral surface area of an infinitesimal element times the lever integrated over the height of the dental component. Hence, the torque becomes $$T = \frac{2\mu F(R^2 + Rr + r^2)}{3\sin(\alpha)(r+R)}.$$

Figure 7:
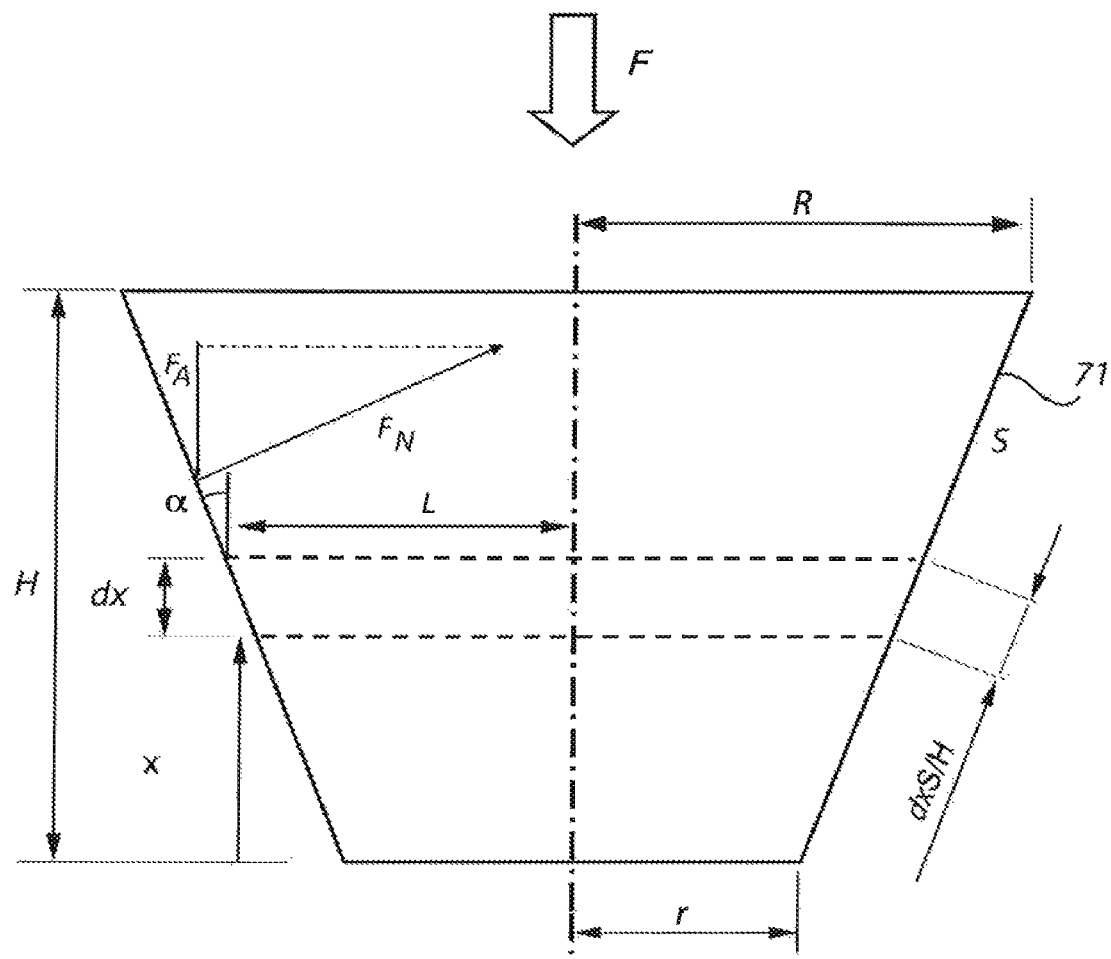
FIG. 7 schematically illustrates a dental component and the factors affecting the transfer of torque between different components.

It is from the above explanation clear that the factors affecting the maximum torque transfer is the angle α the coefficient of μ and the lever L. Even though FIG. 7 schematically illustrates the fixation screw 6, the same reasoning applies to the capacity of transferring torque between the healing cap and the fixture as well, but in that case it is the angle β, please refer to FIG. 1, that should be used.

In FIG. 6 the first and the second indexing means are illustrated in greater detail. The same reference numerals as previously used denotes corresponding features. For sake of clarity, only features differing from previously described embodiments will be elaborated upon in the following description. Most features of the dental implant set 1 are similar to the dental implant set 1 illustrated in the previous figures.

FIG. 6 illustrates a sloped abutment 3b which is to be connected to a symmetrical fixture 104 in a specific rotational orientation with respect to the fixture 104, by means of a fixation screw 6. The abutment 3b, the fixture 104 and the fixation screw 6 together represent a dental implant set 1 according to at least one example embodiment of the invention. FIG. 6 also illustrates a straight symmetrical abutment 3c which may be arranged in a number of different rotational orientations with respect to the same fixture 104.

The abutments 3b, 3c further comprise dental crown-receiving or prosthesis-receiving portions 148 which in use extend coronally of the fixture 104 above the gingiva. Extension portions 50, herein illustrated as coronally flaring up to a shoulder 52, is intended to extend through the gingiva and is provided between the fixture engagement portion 46 and the prosthesis-receiving portion 148.

Although various alternative configurations are conceivable, the socket 24 of the fixture 104 is herein illustrated as having a conical coronal section 26 and a substantially cylindrical intermediate wall section 28 similar to the fixture 4 illustrated in FIGS. 1-3. The first indexing means of the fixture 104 comprises seven indexing elements 30a-30g, herein illustrated as radially extending indexing depressions 30a-30g provided in the intermediate wall section 28 (illustrated in detail in FIG. 6a). The intermediate wall section 28 and the radially extending indexing depressions 30a-30g act as a component engagement portion of the fixture 104. The coronal end of the intermediate wall section 28 forms a shelf 32 with gaps formed by said seven indexing depressions 30a-30g. Six of the indexing depressions 30a-30e, 30g are equidistantly distributed along the circumference of the intermediate wall section 28. The seventh indexing depression 30f is interposed between two (30e, 30g) of said six equidistantly distributed indexing depressions. This is clearly illustrated in the top view of FIG. 6a.

The second indexing means of the abutment 3b comprises seven indexing elements 60a-60g, herein illustrated as radial indexing projections 60a-60g, provided sequentially in the circumferential direction of the cylindrical enveloping surface of the fixture engagement portion 46 (illustrated in detail in FIG. 6b). Similarly to the distribution of the radial indexing depressions 30a-30g in the fixture 104, there are six equidistantly distributed radial indexing projections 60a-60e, 60g on the abutment 3b, while the seventh radial indexing projection 60f is interposed between two (60e, 60g) of said six equidistantly distributed radial indexing projections. With this configuration, the seventh radial indexing projection 60f and its two neighbouring radial indexing projections 60e, 60g can only mate in one correct way with the seventh radial indexing depression 30f and its two neighbouring indexing depressions 30e, 30g. Thus, there is only one rotational orientation possible for the abutment 3b to be connected with respect to the fixture 104. This means that the abutment 3b may have to be rotated 359° before the indexing projections 60 correctly mates with the corresponding indexing depressions 30.

Four of the radial indexing projections can be regarded as first indexing elements 60a-60d, each having an apical end (in FIG. 6 the apical end of the indexing projection 60d is designated with reference numeral 62d). The other three radial indexing projections 60e-60g, namely said seventh radial indexing projection 60f and its two neighbouring indexing projections 60e, 60g, can be regarded as second indexing elements 60e-60g having apical ends 62e-62g located apically of the apical ends of the first indexing elements 60a-60d. This facilitates for the dentist to connect the abutment 3b to the fixture 104 in the correct rotational orientation.

When the abutment 3b is to be connected to the fixture 104, the projections forming said second indexing elements 60e-60g may come in contact with the shelf 32 in the fixture 104. The projections forming said first indexing elements 60a-60d will still be spaced from the shelf 32. The abutment 3b is then rotated so that the second indexing elements 60e-60g fall into the designated indexing depressions 30e-

30g of the fixture 104, i.e. into the seventh indexing depression 30f and its two neighbouring indexing depressions 30e, 30g.

Thus, the second indexing elements 60e-60g will first engage with the seventh indexing depression 30f and its two neighbouring indexing depressions 30e, 30g which represent fourth indexing elements 30e-30g, and thereafter having already found the correct rotational position, the first indexing elements 60a-60d of the abutment 3b can engage with the third indexing elements 30a-30d (the other four indexing depressions 30a-30d) of the fixture 104.

If only a single one (for example 60f) of the seven indexing projections 60a-60g of the abutment 3b would have an apical end located apically of the other six indexing projections, that single one (for example 60f) of the indexing projections 60a-60g could have mated with any one of the seven indexing depressions 30a-30g of the fixture 104. However, only one (in this example 30f) of those seven indexing depressions 30a-30g of the fixture is the correct one which allows the trailing indexing projections of the abutment 3b to also mate with the corresponding indexing depressions in the fixture. If the dentist would place said single one (e.g. 60f) of the seven radially projecting indexing projections 60a-60g into one of the six incorrect radially intended indexing depressions (e.g. 30a-30e, 30g), the trailing indexing projections (e.g. 60a-60e, 60g) of the abutment 3b would not find a mating indexing depression in the fixture 104 but would abut the shelf 32. By additionally letting another one (for example 60g) of the seven indexing projections (60a-60g) have an apical end extending apically of the apical ends of the other indexing projections, said indexing projection (in this example 60g) will be in contact with the shelf 32 of the fixture reducing the risk of the other indexing projection (in this example 60f) falling into the incorrect depression in the fixture 104. Thus, having an abutment 3b with at least one first indexing element and at least two second indexing elements having apical ends apically of the apical end of the first indexing element reduces the risk of the second indexing elements falling into the incorrect indexing depressions in the fixture. Hereby, the abutment 3b may rotate together with the fixation screw 6 in the intermediate position until the indexing projections 60a-60g falls into the correct indexing depressions 30a-30g. Nevertheless, if the dentist brings the abutment 3b towards the fixture 104 in a slightly inclined direction, one of said second indexing elements may still be able to reach into an incorrect indexing depression in the fixture, albeit not very deeply because of the other second indexing element contacting the shelf 32 preventing further advancement. Because the second indexing element cannot fall deeply into an incorrect indexing depression, a rotating motion will easily lift the second indexing element and after continued rotation the correct position will be found. Thus, the abutment 3b and the fixture 104 will stay in the intermediate position until the indexing elements 60a-60g correctly mates with the corresponding indexing depressions 30a-30g.

Having three radially projecting second indexing elements with longer apical extensions than the trailing first indexing element further facilitates correct alignment of the indexing elements of the abutment 3b with those of the fixture. FIG. 6 illustrates an advantageous distribution of three second indexing elements 60e-60g interposed between two (60a, 60d) of the first indexing elements 60a-60d. The middle one (60f) of the second indexing elements 60e-60g cannot fall into an incorrect indexing depression (30a-30e, 30g) in the fixture 104, because of the other two (60e, 60g) second indexing elements provided on either side thereof.

When the abutment 3b is to be connected to the fixture 104, the second indexing elements 60e-60g will with high likelyhood land on the shelf 32, thus requiring the dentist to rotate the abutment 3b into the correct orientation. During such rotation, unless the dentist holds the abutment 3b absolutely straight, one of the two outer second indexing elements (60e, 60 g) might just slightly drop into an incorrect indexing depression in the fixture 104. Since the drop is so small, the dentist can easily continue the rotation until the correct alignment is found.

As illustrated in the bottom view of FIG. 6b, the first indexing elements 60a-60d are somewhat wider than the second indexing elements 60e-60g. In the fixture 104, however, the third and fourth indexing elements 30a-30g have substantially the same width. This has the effect that due to a larger width difference between the second indexing elements 60e-60g and the fourth indexing elements 30e-30g, there will be a lateral play between these indexing elements facilitating the finding of the correct rotational orientation. In other words, because the radially projecting second indexing elements 60e-60g are laterally/transversely underdimensioned with respect to the radially indenting fourth indexing elements 30e-30g, they will more easily fall into place than if they were of substantially the same dimensions. The radially projecting first indexing elements 60a-60d are dimensionally closer matched to the radially indenting third indexing elements 30a-30d, reducing potential lateral play, and instead ensuring a substantially well-defined rotational position of the abutment 3b with respect to the fixture 104. It should be understood that rather than making the second indexing elements 60e-60g narrower than the first indexing elements 60a-60d, an option would be to make them of equal width and instead make the fourth indexing elements 30e-30g wider than the third indexing elements 30a-30d. Thus, the relatively large lateral play between the second and fourth indexing elements can be accomplished with various designs of the abutment 3b and/or fixture 104.

In FIG. 6, the second indexing elements 60e-60g have been illustrated as extending all the way to the apical end of the abutment 3b, however, other alternatives are conceivable. For instance, the second indexing elements 60e-60g may extend somewhat shorter, as long as the apical ends 62e-62g thereof are located apically of the apical ends of the first indexing elements 60a-60d, or they may extend longer, i.e. beyond the apical end of the abutment 3b.

Furthermore, it should be noted that the coronal extension of the second indexing elements 60e-60g may also be shorter. In fact, it should be understood that, for the radially projecting second indexing elements 60e-60g to fall into connection with the radially indenting fourth indexing elements 30e-30g, the second indexing elements 60e-60g could be designed as substantially flat plates projecting from the surface of the fixture engagement portion 46 of the abutment 3b. Once the flat plates are received by the associated indexing depressions 30e-30g, the whole abutment 3b, including the following indexing elements 60a-60d (i.e. the other radial projections which have the purpose to provide a rotational lock) will be guided in the desired direction for completing the insertion of the abutment 3b into the fixture 104.

It should also be noted that, although second indexing elements 60e-60g have been presented in FIG. 6 as the seventh radial projection 60f and its two neighbouring radial projections 60e, 60g, other alternatives are possible. For instance, the seventh radial indexing projection 60f and a non-neighbouring indexing projection (such as projection 60a, 60b or 60c) could have their apical ends located apically of the apical ends of the other radial projections. These two radial projections would be leading and be the first ones to abut the shelf 32 provided between the indexing depressions in the fixture 104. They can only fall down from the shelf when the seventh radial indexing projection 60*f* is aligned with the seventh radial indexing depression 30*f*. Thus, in general terms, according to at least one example embodiment, the distribution of the second indexing elements around the fixture engagement portion is asymmetrical relative to the distribution of the first indexing elements. In other words there is at least one pair of second indexing elements (for instance corresponding to the illustrated positions of 60*f*/60*g*, or 60*f*/60*a*, or 60*f*/60*b*) spaced differently than the spacing between any pair of first indexing elements.

FIG. 6 and FIG. 6*c* also illustrate another abutment 3*c*. It has six equally-dimensioned and equidistantly distributed indexing elements in the form of radial indexing projections 70. Unlike the first abutment 3*b*, this other abutment 3*c* lacks a seventh indexing projection. Thus, this other abutment 3*c* may be connected to the fixture 104 in six different rotational orientations. This means that the abutment 3*c* may have to be rotated 59° before the indexing projections 70 correctly mates with the corresponding indexing depressions 30.

Throughout the detailed description, a healing cap 2 abutments with sloped surfaces 3*a*, 3*b* and an abutment with a straight surface 3*c* have been used as examples of dental components. It should be noted that other types of dental components may be used with the present invention. For example, the dental component may, in addition to the illustrated embodiments, be an abutment replica, a driver, a healing cap, an impression pick-up element, a digital transfer coping, a healing abutment, a soft tissue former, etc.

The person skilled in the art realizes that the present invention by no means is limited to the embodiments described above. For example dental implant sets 1 with other indexing means 100, 200 may be used. Furthermore, the different embodiments may be combined with each other in any suitable manner. For example, the indexing means illustrated in one embodiment may readily be used in another embodiment.

The invention claimed is:

1. A dental implant set comprising:
   a fixture for insertion into a bore hole arranged in bone tissue having first indexing means,
   a dental component having second indexing means and being adaptable to the fixture in an engaged position where the first indexing means and second indexing means mate and in an intermediate position where the dental component and the fixture are in contact with each other but the first indexing means and the second indexing means do not mate, and
   a fixation screw being adapted for fixating the dental component to the fixture,
   wherein in the intermediate position:
      a first contacting surface of the fixation screw is arranged to abut a second contacting surface of the dental component and a third contacting surface of the dental component is arranged to abut a fourth contacting surface of the fixture, and
   wherein the dental implant set is arranged such that the maximum capacity to transmit torque is greater between the first contacting surface and second contacting surface than between the third contacting surface and fourth contacting surface, so that when the fixation screw is subject to a torque and an axial force applied by a user, the dental component will rotate with the fixation screw,
   wherein the first indexing means comprises indexing depressions extending in the radial direction from a first surface of the fixture and the second indexing means comprises indexing projections extending in the radial direction from a second surface of the dental component, and wherein the indexing depressions and projections are distributed along the circumference of the first surface and second surface of the fixture and the dental component respectively, such that the dental component can only mate in certain specific rotational orientations with respect to the fixture, and
   wherein the dental component further comprises at least one first indexing projection, and at least two second indexing projections, and wherein the fixture further comprises at least one first indexing depression, and at least two second indexing depressions, wherein the at least one first indexing projection and at least one second indexing projection and the at least one first indexing depression and at least two second indexing depressions are distributed along the circumference of the dental component and the fixture, respectively, in such way that the dental component can only mate in one rotational orientation with respect to the fixture, wherein the at least one first indexing projection is only enabled to mate with the at least one first indexing depression after said at least two second indexing projections have mated with said at least two second indexing depressions.

2. A dental implant set according to claim 1, wherein in the engaged position the dental component is arranged such that the fixation screw may rotate relative to the dental component.

3. A dental implant set according to claim 1, wherein the fixture further comprises an axis, and at least one of the first contacting surface and second contacting surface forms a smaller angle to the axis than at least one of the third contacting surface and fourth contacting surface.

4. A dental implant set according to claim 3, wherein at least one of the first contacting surface and second contacting surface forms a first angle of 5°-30° relative to the axis of the fixture, and wherein at least one of the third contacting surface and fourth contacting surface forms a second angle of 50°-70° relative to the axis of the fixture.

5. A dental implant set according to claim 1, wherein the fixture further comprises an axis, and wherein the first contacting surface and second contacting surface forms an essentially equal first angle to the axis, and wherein the third contacting surface and fourth contacting surface forms an essentially equal second angle to the axis.

6. A dental implant set according to claim 5, wherein at least one of the first contacting surface and second contacting surface forms a first angle of 5°-30° relative to the axis of the fixture, and wherein at least one of the third contacting surface and fourth contacting surface forms a second angle of 50°-70° relative to the axis of the fixture.

7. A dental implant set according to claim 1, wherein at least one of the contacting surfaces have different surface characteristics from the others in order to modify the coefficient of friction between the first contacting surface and second contacting surface or between the third contacting surface and fourth contacting surface.

8. A dental implant set according to claim 1, wherein at least one of the contacting surfaces is coated with a material in order to modify the coefficient of friction between the first contacting surface and second contacting surface or between the third contacting surface and fourth contacting surface.

9. A dental implant set according to claim 1, wherein at least one of the contacting surfaces are surface treated in order to modify the coefficient of friction between the first contacting surface and second contacting surface or between the third contacting surface and fourth contacting surface.

10. A dental implant set according to claim 1, wherein the contacting surfaces are provided such that a first frictional force between the first contacting surface and second contacting surface is larger for a given applied axial force than a second frictional force between the third contacting surface and fourth contacting surface for the same applied axial force.

11. A dental implant set according to claim 1, wherein the fixture further comprises a bore provided with an internal thread, and wherein the fixation screw further comprises an external thread adapted to engage said thread of the bore of the fixture, and wherein the length of the fixation screw is adapted such that the external thread of the fixation screw is positioned coronally to the thread of the bore of the fixture in said intermediate position.

12. A dental implant set according to claim 11, wherein the length of the fixation screw is adapted such that the external thread of the fixation screw can engage the thread of the bore of the fixture when the fixture and the dental component are arranged in the engaged position.

* * * * *